United States Patent [19]

Kakehi et al.

[11] Patent Number: 4,744,511
[45] Date of Patent: May 17, 1988

[54] AIR CONDITIONER FOR AUTOMOBILES

[75] Inventors: Tohru Kakehi, Nagoya; Katsumasa Matsui; Masahiro Ohba, both of Okazaki, all of Japan

[73] Assignee: Nippondenso Co., Ltd., Kariya, Japan

[21] Appl. No.: 935,683

[22] Filed: Nov. 26, 1986

[30] Foreign Application Priority Data

Nov. 27, 1985 [JP] Japan .............................. 60-267022
Nov. 29, 1985 [JP] Japan .............................. 60-270292

[51] Int. Cl.$^4$ ...................... F25D 17/00; G05B 13/04
[52] U.S. Cl. ........................................ 236/13; 62/180; 165/30; 165/42; 364/151
[58] Field of Search .............. 236/49, 13, 91 R, 91 D; 62/244, 186, 180; 165/16, 30, 42; 364/557, 551, 149, 150, 151

[56] References Cited

U.S. PATENT DOCUMENTS 4,054,780 10/1977 Bartley et al. ...................... 364/106
4,494,184 1/1985 Crevel .................................. 364/178
4,563,734 1/1986 Mori et al. .......................... 364/157
4,570,450 2/1986 Takemi et al. ........................ 62/199
4,696,167 9/1987 Matsui et al. ...................... 62/244 X

OTHER PUBLICATIONS

Melsa et al, "Linear Control Systems", McGraw-Hill, N.Y., 1969, pp. 503–510.

Primary Examiner—Harry B. Tanner
Attorney, Agent, or Firm—Cushman, Darby & Cushman

[57] ABSTRACT

Disclosed is an air conditioner for automobiles comprising an air conditioning unit for adjusting at least temperature of blow-off air discharged into a vehicle compartment, a decision device for determining whether the air conditioning unit is in an initial state that the air conditioning unit is started, and an air conditioning control unit for feedback controlling the air conditioning unit so that the detected internal temperature becomes equal to the set target temperature. The air conditioning control unit is formed as an integral-added optimal regulator which performs the feedback control on the basis of optimal feedback gain predetermined in accordance with a dynamic model of an air conditioning system. The air conditioning control unit outputs to the air conditioning unit controlled variables decided in accordance with the results of the determination made by the decision device.

15 Claims, 15 Drawing Sheets

AIR CONDITIONER FOR AUTOMOBILES

BACKGROUND OF THE INVENTION

This invention relates generally to air conditioning system for automobiles, and more particularly to an automatic control system for such an air conditioner based on dynamic models of the system.

Various types of air conditioning systems have been used and applied for automobiles so as to control the temperature, humidity, cleanliness and so on of the air within a vehicle compartment. Among such various types, an air conditioning apparatus which controls only the temperature has been widely used. In such air conditioning apparatus for automobiles, in order to control the air temperature at air outlets throughout a wide range from a low temperature to a high temperature, air sent in the apparatus is once cooled by a cooler, such as an evaporator, and then the cooled air is heated by a heater, such as a heater core, so as to obtain a desired temperature of the blowing air. This series of apparatus for blowing, cooling and heating air is referred to as blowing air control measure, and the entire system is referred to as an air conditioning unit. Two types of such air conditioning units have been widely used in these days as an air conditioner of automobiles. One of such units is a reheat type which is arranged to change the heat value supplied to a heater. The other is an air-mixing type which is arranged to change the ratio of air passing through the heater.

In either of these two types, the temperature of air within a vehicle compartment is controlled by the heat value of the blow off air, i.e. the flow rate and temperature of the blow off air. The flow rate of the blow off air is determined by the blowing capability of a blower motor or the like. The temperature of the air is determined by the cooling capability of the cooler (evaporator), i.e. the capability of the cooling system including a compressor and heating capability of a heater. This includes, for example, the amount of circulated hot water in the case of a reheat type and the damper opening degree of the air-mixing damper in the case of an air-mixing type.

When an air conditioning unit starts operating, the temperature of air within a vehicle compartment is detected to feedback control the temperature and flow rate of blow off air on the basis of the difference between the detected temperature and a predetermined target temperature. As a result, the temperature of air within the vehicle compartment, which will be referred to as the internal air temperature hereinafter, approaches the setting target temperature gradually, because of the heat value of the blow off air.

Such control of air temperature is disclosed in Japanese Patent Provisional Publications Nos. 55-47914 and 55-77659.

The above-described conventional apparatus is based on feedback control which is performed on the basis of the difference between a detected internal air temperature and a setting target temperature, so that the former approaches the latter. Some conventional apparatus further adopts prediction control in which the amount of control is determined so that predetermined conditions of thermal equilibrium are satisfied considering the external air temperature and solar radiation amount. Furthermore, the amount of air to be blown off is controlled such that the blow off air amount is increased when the difference between the above-mentioned temperatures is large and the blow off air amount is decreased as the difference becomes smaller.

Therefore, transient response at the time of the change of the setting value of the target temperature is not necessarily satisfactory. Thus the transient response is poor depending on the internal air temperature at such instant, the capability of the air conditioning unit or the like. Therefore, there has been a problem, that it is difficult to provide a comfortable environment to vehicle occupants.

While the capability of an air conditioning unit is determined by the combination of the blow off air amount, cooling capability of the cooler, heating capability of the heater and so on, it is difficult to determine what combination of these factors provides an optimal control. Therefore, these factors have hitherto been combined simply by the experience of designers as the above-mentioned control of blow off air amount. Accordingly, the capability of such an air conditioning unit has not hitherto been derived sufficiently.

Additional problems would also arise when the air conditioning unit is controlled in the same manner as in the normal operation at the time of initial turn on of the air conditioner. These problems occuring in this initial state when the control of the air conditioning unit is started are, for example, a reverse control that the internal air temperature is once separated from the target temparture and an excessive control when the internal air temperature rapidly approaches the target temperature.

Furthermore, when the target temperature is set near the limits of the possible control range of the internal air temperature of a vehicle by an air conditioning unit, there is a problem in which the follow-up of the control is deteriorated due to overshoot and so on from the setting target value of the internal air temperature when the control is performed taking into account the deviation between the target temperature and the internal air temperature from the past.

SUMMARY OF THE INVENTION

The present invention has been developed in order to eliminate the above-described disadvantages inherent to the conventional air conditioner for automobiles.

It is therefore an object of the present invention to provide a new and improved air conditioner for automobiles, which is capable of optimally controlling the temperature of air within vehicle compartment from the initial operating time, deriving fully the capability of a used air conditioning unit.

A further object of the present invention is to provide a new and improved air conditioner for automobiles which is capable of optimally controlling the temperture of air within vehicle compartment with fine follow-up even if a target temperature is set to the vicinity of the limits of the controllable range.

In accordance with the present invention there is provided an air conditioner for automobiles comprising: air conditioning means for adjusting variables including at least temperature of blow-off air discharged into a vehicle compartment; temperature setting means for setting a target temperature within the vehicle compartment; temperature detecting means for detecting a temperature within the vehicle compartment; decision means for determining whether the air conditioning means is in an initial state that the air conditioning means is started; and air conditioning control means for feedback controlling the air conditioning means so that the detected internal temperature becomes equal to the set target temperature, the air conditioning control means being formed as an integral-added optimal regulator which performs the feedback control on the basis of optimal feedback gain predetermined in accordance with a dynamic model of an air conditioning system, the air conditioning control means outputting to the air conditioning means controlled variables decided in accordance with the results of the determination made by the decision means.

In accordance with the present invention there is further provided an air conditioner for automobiles comprising: air conditioning means for adjusting variables including at least temperature of blow-off air discharged into a vehicle compartment; temperature setting means for setting a target temperature within said vehicle compartment; temperature detecting means for detecting a temperature within said vehicle compartment; controlled variable determining means for determining whether controlled variable is within a predetermined range; temperature decision means for determining whether the internal temperature is in a perdetermined relation to said target temperature; and air conditioning control means for feedback controlling said air conditioning means so that said detected internal temperature becomes equal to the set target temperature, said air conditioning control means being formed as an integral-added optimal regulator which performs said feedback control on the basis of optimal feedback gain predetermined in accordance with a dynamic model of an air conditioning system, said air conditioning control means controlling controlled variables outputted to said air conditioning means in accordance with the results of the determinations made by said controlled variable determining means and said temperature decision means.

In accordance with the present invention there is also provided an air conditioner for automobiles comprising: air conditioning means for adjusting variables including at least temperature of blow-off air discharged into a vehicle compartment; temperature setting means for setting a target temperature within said vehicle compartment; temperature detecting means for detecting a temperature within said vehicle compartment; controlled variable determining means for determining whether controlled variable is within a predetermined range; temperature decision means for determining whether the internal temperature is in a perdetermined relation to said target temperature; and air conditioning control means for feedback controlling said air conditioning means so that said detected internal temperature becomes equal to the set target temperature, said air conditioning control means being formed as an integral-added optimal regulator which peforms said feedback control on the basis of optimal feedback gain predetermined in accordance with a dynamic model of an air conditioning system, said air conditioning control means including: a state observer for estimating state variables indicating an internal state of said air conditioning system on the basis of the controlled variables to said air conditioning means and the detected internal temperature using parameters predetermined in accordance with the dynamic model of said air conditioning system; a feedback amount calculating section for calculating a first feedback amount affecting the controlled variables to said air conditioning means on the basis of an error of said internal temperature from said target temperature and elements relating to error of said optimal feedback gain and for accumulating the calculated first feedback amount; a feedback controlled variable calculating section for outputting the sum of a second feedback amount and the accumulated first feedback amount to said air conditioning means as controlled variables, said second feedback amount being obtained on the basis of the state variables and elements relating to the state variables of said optimal feedback gain; and an accumulation stopping section for interrupting the accumulation of the first feedback amount until said temperature decision means determines that the internal temperature is in the predetermined relation to said target temperature after said controlled variable determining means determins that the controlled variable is not within the predetermined range.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

First Embodiment

Figure 1:
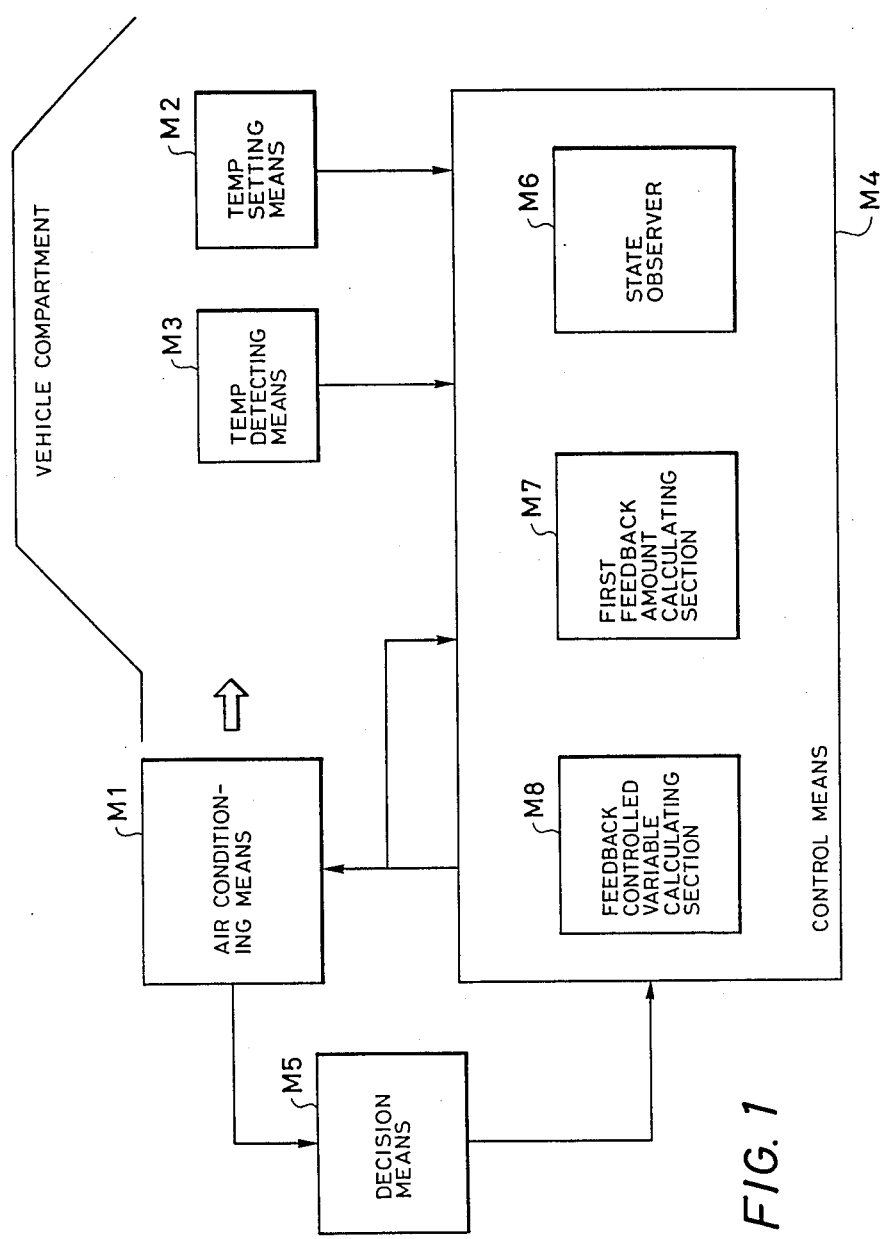
FIG. 1 is a basic structural diagram showing an air conditioner according to a first embodiment of the present invention.

Referring now to FIG. 1, there is schematically illustrated an arrangement of the air conditioner according to a first embodiment of the present invention. The air-conditioner generally comprises air-conditioning means M1 which controls at least a temperature of the blow off air discharged into a vehicle compartment in accordance with controlled variables from the outside, temperature setting means M2 for setting a target temperture within the vehicle compartment, temperature detecting means M3 for detecting the temperature within the vehicle compartment, and control means M4 formed as an integral-added optimal regulator for feedback-controlling the air conditioning means M1 using an optimal feedback gain predetermined in accordance with a dynamic model of the system relating to an air conditioning for a motor vehicle so that the internal air temperature is equal to the target temperature, and decision means M5 for determining whether the air conditioning means M1 is in the initial condition. The control means M4 includes a state observer M6 for estimating state variables indicating the dynamic internal state of the system on the basis of the controlled variables to the air-conditioning means M1 and the internal air temperature of the vehicle compartment using parameters predetermined in accordance with the dynamic model of the air conditioning system, a feedback amount calculating section M7 for calculating a first feedback amount relating to the controlled variables to the air conditioning means M1 on the basis of elements connected to the deviation of the internal air temperature from the target temperature and the deviation of the optimal feedback gain and for accumulating the calculated first feedback mount, and a feedback controlled-variable calculating section M8 for outputting to the air-conditioning means M1 the controlled variable which is the sum of the accumulated first feedback amount and a second feedback amount obtained from the elements relating to the state variables and the state variables of the optimal feedback gain.

The control means M4 is arranged such that each reference setting value predetermined in accordance with the normal operating condition of the air-conditioning means M1 is outputted as a controlled variable to the air-conditioning means M1 when the decision means M5 has determined in terms of the air-conditioning means M1 being in the initial condition, that is, the condition that the air-conditioning means M1 is started.

In the above, the air-conditioning means M1 substantially corresponds to the air conditioning unit, which has been described in the above-mentioned prior art, and comprises at least means for controlling a temperature of the blow off air. For instance, taking temperature as one of the variables of blow off air, the above-mentioned means corresponds to an actuator which controls a capability of cooler, such as an evaporator, or another actuator which controls opening degree of an air-mixing damper or the heat value supplied to a heater (heater core). One type of actuator for controlling the capability of a cooler varies the capability by changing a capacity of a compressor and another type which controls the flow rate of a cooling medium.

The temperature setting means M2 is arranged to set a target temperature within the compartment of a vehicle. For example, employed as the tempeature setting means M2 is a temperature setting device operated by a vehicle driver or means for setting a predetermined target temperature on the basis of the deviation of the compartment temperature from the external temperature.

The temperature detecting means M3 is arranged to detect the temperature of air within the compartment of the vehicle (internal air temperature). It is appropriate to use a thermistor type temperature sensor or the like. It is also appropriate to use a thermocouple in view of fine responsibility.

The decision means M5 is arranged to determine whether the air-conditioning means M1 is in the initial condition, that is, the condition that it is started to be controlled. For example, this is realized as a discrete logic circuit to detect the start of control of the air-conditioning means M1. It is also appropriate to be arranged such that the initial time of the air-conditioning means M1 is determined in accordance with predetermined processes using known CPU, and the associated units such as ROM and RAM.

The control means M4 includes the state observer M6, first feedback amount calculating section M7 and feedback controlled-variable calculating section M8, and is formed as an integral-added optimal regulator for performing feedback-control so that the temperature of air within the vehicle compartment becomes equal to the target temperature. The control means M4 is actualized as an logic operation circuit using a microprocessor together with peripheral elements, such as ROM and RAM, and input/output circuit, and is arranged to control the air-conditioning means M1 by the controlled variable which is determined by an optimal feedback gain predetermined in accordance with (a) dynamic model(s) of the system where air conditioning is performed on the basis of a target temperature set by the temperature setting means M2 and the internal air temperature detected by the air temperature detecting means M3 in accordance with a processing procedure stored in advance.

A method of constituting such integral-added optimal regulator is described in detail in documents, such as "Linear System Control Theory" written by Katsuhisa FURUTA published by Shokodo Japan in 1976. An outlook for the method of actual forming of such regulator will be given hereinbelow. In the following description, the references F, X, A, B, C, D, J, y, u, L, G, Q, R, P, M, S indicate vectors (matrix), a superscript $T$ such as $A^T$ indicating a transposed matrix, a superscript $-1$ such as $A^{-1}$ indicating an inverse matrix, a symbol $\wedge$ such as $\hat{X}$ indicating an estimate, a symbol $\sim$ such as $\tilde{C}$ indicating an amount handled by another system, i.e. a state observer (which will be simply referred to as observer hereinafter) which amount is generated by way of a transform or the like from the controlled object, and a symbol * such as y* indicating a target value respectively.

It is known in modern control theory that in a control of a controlled object, i.e. the system relating to internal air temperature, in this case, the dynamic behaviour of the controlled object is described in a discrete-time system as:

$$X(k) = A \cdot X(k-1) + B \cdot u(k-1) \tag{1}$$

$$y(k-1) = C \cdot X(k-1) \tag{2}$$

The above Eq. (1) is called a state equation, and Eq. (2) is called an output equation, when a term X(k) indicates state variables which represent the internal state of the system, a term u(k) indicates vectors comprising variables of blow off air controlled by the air-conditioning means M1, and a term y(k) indicates vectors comprising variables representing the output of the system. In the system of air conditioning handled by the present invention, since this output vector y(k) includes only the internal air temperature, this will be handled as a scalar y(k) hereinafter. The Eqs. (1) and (2) are both described in a discrete-time system, and a subscript "k"

indicates that the value is of the present time, while a subscript "k−1" indicates that the value is of an instant which is one sampling cycle before the present time.

The state variables $X(k)$ indicating the internal state of the system where air conditioning, i.e. temperature control of the internal air in this case, is performed, represents information relating to the history of the system which is necessary and sufficient for predicting the influence in future in the control system. Therefore, the dynamic models of the system, namely how the temperature within the vehicle compartment (internal air temperture) where air conditioning is performed by the air-conditioning means M1 behaves, will be clear, and if we can determine vectors A, B and C of Eqs. (1) and (2), then it is possible to optimally control the internal air temperature using the state variables $X(k)$. In a servo system, while the system has to be expanded since the control means M4 is not merely a regulator for the system wherein the target value is always constant but is a regulator for a servo system wherein the target value is always varied, this will be described hereinlater.

It is difficult to accurately theoretically obtain dynamic models of a complex objective such as air conditioning, and therefore, it is necessary to obtain the same through experiments. This is a method of constructing a model, which method is the so called system identification, and in the case that an air conditioner for an automobile is operated under a given state, the model is constructed according to state equations (1) and output equation (2) with which linear approximation is satisfied around the given state. Therefore, even in the case that the dynamic model related to the operation thereof is nonlinear, a linear approximation can be performed by dividing into a plurality of normal operating states. It therefore becomes possible to determine each dynamic model. In this case, with respect to the controlled variable and internal air temperature, the variables are calculated using a perturbation component from each reference set value on a normal operating point using a linear approximation. Therefore, it is required to process the sum of the calculated value and each the reference set value as a controlled variable.

If the controlled object is of a type of which a physical model can be relatively easily constructed, then the model (i.e. vectors A, B, and C) of a dynamic system can be determined through system identification which can be made through a method such as frequency response method or spectrum analysis. However, in the case of a controlled object of a multivariable system, such as the system taken here where air conditioning is performed, it is difficult to make a physical model which is accurately approximated, and in such a case, dynamic model is constructed through least squares method, instrumental variable method or on-line identification.

Once a dynamic model is determined, an amount of feedback is determined from the state variables $X(x)$, the internal air temperature $y(k)$ and its target temperature $y^*(k)$, so that the controlled amount of the variables $u(k)$ of blow off air are theoretically and optimally determined.

In an air conditioner for automobiles, while the amount of influence of airflow rate by a blower motor on the internal air temperature, i.e. the amount of contribution of airflow rate to the internal air temperature, or the amount of influence of the opening degree of the air-mixing damper on the internal air temperature may be used as variables which are directly related to the control of the internal air temperature, and is treated as the state variables $X(k)$. However, most of such variables cannot be directly observed. Therefore, a means called state observer (observer) is formed within the control means M4 using which it is possible to estimate the state variables $X(k)$ of the system where air conditioning is performed using values of the internal air temperature and the blow off air. This is the observer according to modern control theory, and various types of observer and their designing methods are known. These are described in detail, for instance, in "Mechanical System Control" written by Katsuhisa Furuta, published from Ohm Co. Ltd. in 1984, and the observer may be designed as a minimal order observer or a finite time settling observer in correspondence with the fashion of an applied controlled object, i.e. the air conditioner for automobile in this case.

The system, which is the control object of the control means M4, is a servo system in which the target temperature is varied in a stepwise fashion by the temperature setting means M2. Namely, the target temperature is varied in accordance with, for example, the operation by the vehicle driver or the demand in terms of an auto air-conditioner and so on. Generally, in the control of the servo system, it is required to be controlled so that the output of the control object follows a provided target input without steady-state deviation. Therefore, it is necessary that and appropriate-order integration is contained in the transfer function. In the present invention, the first order integration may be taken into account since the case that the target temperature is varied in stepwise fashion is being estimated. Therefore, the control means M4 is provided with the first feedback amount calculating section for calculating the feedback amount relating to the controlled variable to the air conditioning means M1 on the basis of elements connected to the deviation of the internal air temperature from the target temperature and the deviation of the optimal feedback gain and for accumulating the calculated first feedback mount, so that the control system, being the object, is expanded to a servo system.

Furthermore, a control means M4 has the feedback controlled-variable calculating section M8 for outputting to the air-conditioning means M1 the controlled variable which is sum of the accumulated first feedback amount and a second feedback amount obtained from the elements relating to the state variables and the state variables of the optimal feedback gain, so that the controlled variable is determined as an integral-added optimal regulator.

Nextly, it will be described in connection with optimal feedback gain. In an optimal regulator to which an integral element is added as described in the above, the way of finding a control input (the variables of the blow off air of the system where air conditioning is performed in this case) which minimizes a performance index J is made clear, while it is also known that the optimal feedback gain can be obtained from a solution of Riccati equation, A, B, C matrixes of the state equation (1) and the output equation (2), and the weighting parameter used in performance function (see the above-mentioned book). In the above, the weighting parameter is initially arbitrarily given so as to change the weighting in the regulation, by the performance index J, of the behaviour of the variables of the blow off air of the system where air conditioning is performed. It is possible to determine an optimal value through repetition of simulation by changing the weighting parameter by a given amount from the behavior of the blow off air variables which are obtained as the result of simulation performed by a large computer with an arbitrary weighting parameter being given. As a result, an optimal feedback gain F is also determined.

Therefore, the control means M4 in the air conditioner for an automobile according to the present invention is formed as an integral-added optimal regulator using a dynamic model of a system where air conditioning is performed. This dynamic model is determined in advance through system identification, and the parameter of the observer therein and an optimal feedback gain F and so on are determined in advance through simulation.

While a scenario has been described that the state variable X(k) is an amount indicating the internal state of the system where air conditioning is performed, this may be a variable which corresponds to an actual physical amount, such as the rotational speed of the blower motor or an opening degree of an air-mixing damper and so on. This may be designed as a vector which comprises variables converted as variables which directly influence the internal air temperature as described in the above.

In addition, the control means M4 is arranged to output each reference set value on normal operating point in the above-mentioned linear approximation to the air conditioning means M1 as a controlled variable when the decision means M5 has determined that the air-conditioning means M1 is in its initial condition.

Accordingly, in the air conditioner for automobiles according to the present invention, as described in FIG. 1, the state observer M6 estimates state variables so that the temperature of air within the compartment of a vehicle detected by the temperature detecting means M3 becomes equal to the target temperature set by the temperature setting means M2, the first feedback amount calculating section M7 calculates the first feedback amount on the basis of the deviation between both the temperatures and the optimal feedback gain and accumulates the calculated first feedback amount, and the feedback controlled-variable calculating means M8 outputs as the controlled variable to the air-conditioning means M1 the sum of the accumulated first feedback amount and the second feedback amount determined on the basis of the state variables and optimal feedback gain. When the initial time is determined by the decision means M5, the control means M4 outputs to the air-conditioning means M1, as the controlled variable, each reference set value predetermined in accordance with the steady-state operating condition of the air-conditioning means M1.

Namely, at the time that the control of the air-conditioning means M1 is started, the reference set value, in place of the feedback amount determined on the basis of the state variables and the accumulated value of the deviation of the internal air temperature from the target temperature, is used as the controlled variable for the control of the air-conditioning means M1.

Therefore, the air conditioner for automobiles according to the present invention optimally controls at least temperature of blow off air of the air-conditioning means M1 from the initial time of control so that the temperature of air within the compartment of a vehicle (internal air temperature) quickly becomes equal to the target temperature.

The first embodiment of the present invention will be described hereinbelow with reference to other drawings in further detail.

Figure 2:
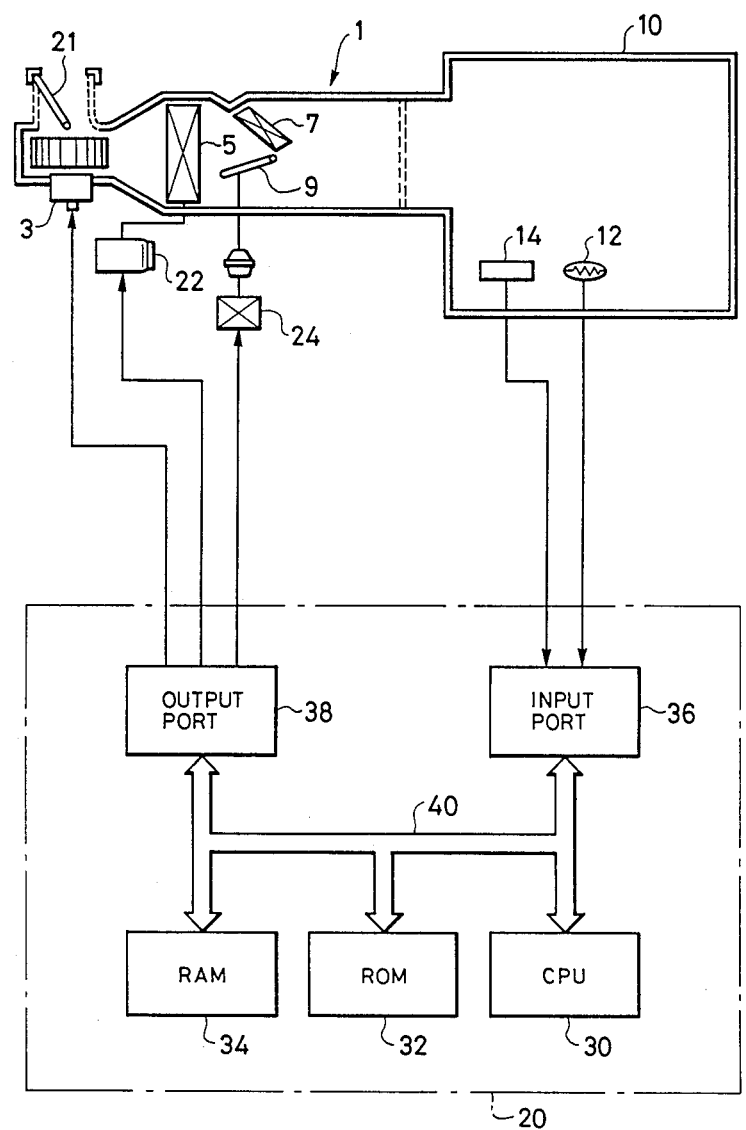
FIG. 2 is a schematic diagram illustrating the air conditioner of the first embodiment.

FIG. 2 is a schematic structural diagram showing an air conditioning apparatus for automobiles according to the first embodiment of the present invention. In FIG. 2, an air conditioning unit 1 is formed as air-mixing type centering a blower motor 3, an evaporator 5, a heater core 7, an air-mixing damper 9 and so on. A passenger room 10 is equipped with an internal air temperature sensor 12 for detecting the internal air temperature TR, a temperature setter 14 and so on. The air conditioning unit 1 is controlled by an electronic circuit unit 20.

In the air conditioning unit 1, air sucked by the blower motor 3 via an internal/external air changeover damper 21 passes through the evaporator 5 to be cooled once, and then a portion thereof passes through the heater core 7 to be reheated and is then mixed with air which does not pass through the heater core 7 to be blown off into the passenger room 10. The ratio between air passing through the heater core and air that dose not pass therethrough is controlled by the opening degree of the air-mixing damper 9. The evaporator 5 comprises a compressor 22 and conduits for circulating cooling medium, and is arranged to control the cooling capability by controlling the capability of the compressor 22 by the electronic circuit 20. The control of the capability of the compressor 22, whose prime mover is an unshown vehicle-mounted engine, is performed by changing the flow rate of the cooling medium by an actuator (not shown) which controls an opening area of a passage communicating between a high pressure chamber and a low pressure chamber of the compressor 22. The electronic circuit 20 controls the cooling capability by controlling the driving voltage fed to the actuator, and this driving voltage of the built-in actuator is simply referred to as a drive signal (drive voltage) of the compressor 22 hereinafter.

The heater core 7 is arranged so that coolant (hot water) of an unshown engine circulates, and when engine warming up is terminated, a given amount of heat value is supplied to the heater core 7. Furthermore, the air-mixing damper 9 is arranged so that the damper opening degree is controlled by a damper actuator 24.

The electronic circuit 20 is constructed as a logic operation circuit centering around a well known CPU 30, ROM 32, RAM 34 and so on with input port 36 and output port 38 being connected to each other by a common bus 40. The input port 36 inputs an internal air temperature TR from the internal air temperature sensor 12 and a target temperature TR* from a temperature setter 14 as electrical signals respectively corresponding thereto. The output port 38 outputs a drive signal VB for driving the blower motor 3, a drive signal VC of the compressor 22, a drive signal VD of the damper actuator 24 and so on.

Figure 3:
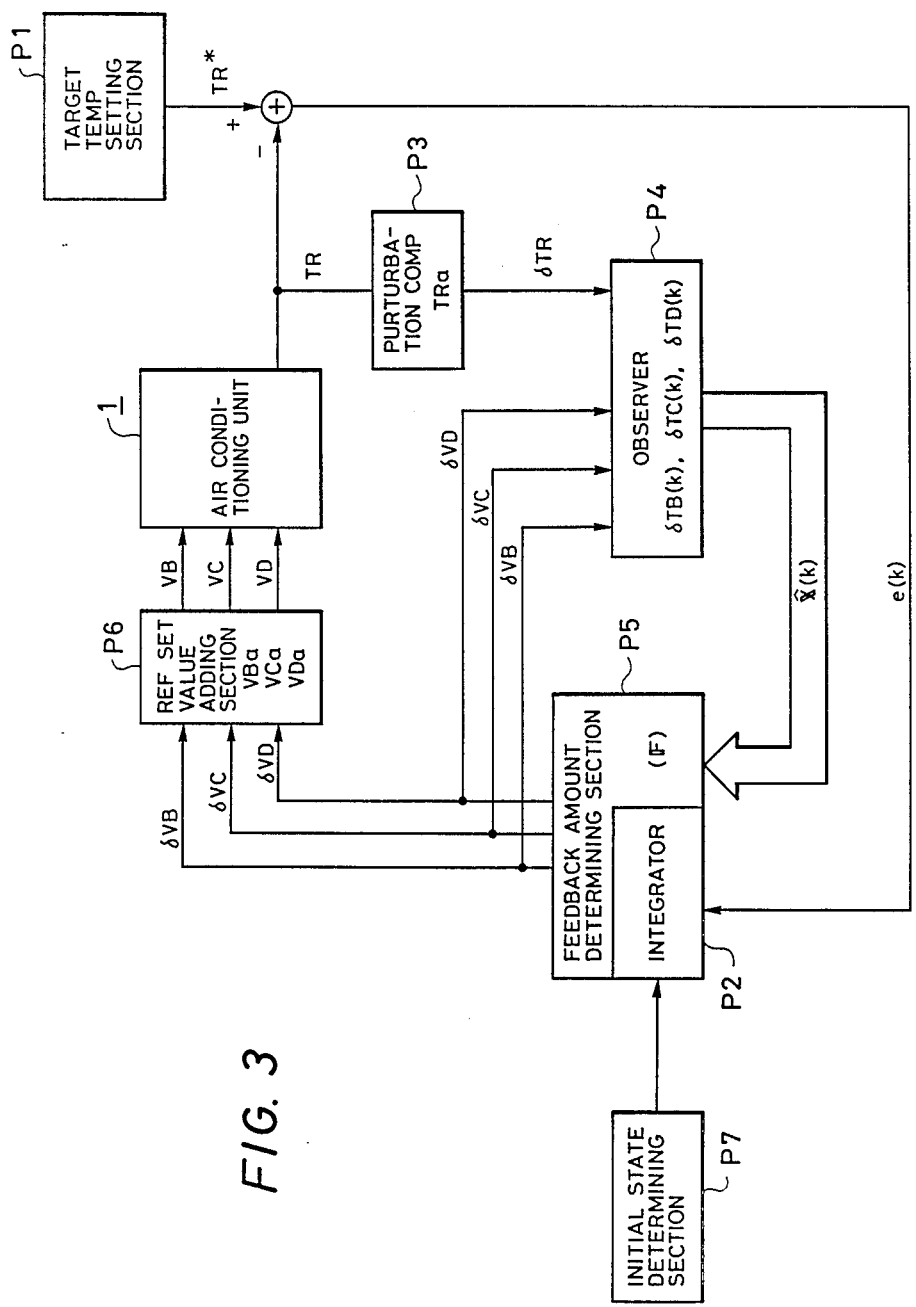
FIG. 3 is a control system diagram showing a system where air conditioning is performed by the first embodiment.

The electronic circuit 20 feedback controls the blower motor 3, the compressor 22, the damper actuator 24 and so on according to a program prestored in the ROM 32 by drive signals (VB, VC, VD and so on) on the basis of signals (TR*, TR and so on) inputted from the temperature setter 14, the internal air temperature sensor 12 and so on. Now a control model used for the feedback control will be described. Especially, the way of obtaining the vectors A, B and C in the state equation (1) and output equation (2) used in connection with system identification, and the designing of the observer based thereon, and the way of obtaining the feedback gain F will be described along actual cases. FIG. 3 is a control system diagram showing a control model of a system where air conditioning is performed. FIG. 3 just shows the control system, and therefore, it does not show hardware structure. The control system shown in FIG. 3 is actualized by executing a series of programs shown in a flowchart of FIG. 7 in practice, and is therefore actualized as a discrete-time system.

As shown in FIG. 3, the target temperature TR* is set by a target temperature setting portion P1. In this embodiment, the temperature setter 14 corresponds to the target temperature setting portion P1.

An integrator P2 is used to obtain deviation-accumulated values ZTRB(k), ZTRC(k), ZTRD(k), which are the first feedback amount, by accumulating the value obtained by multiplying the differences between the target temperature TR* and the internal air temperature TR by elements F14, F24, F34 corresponding to the deviation of optimal feedback gain F which will be described hereinafter.

A perturbation component extracting portion P3 extracts a perturbation component from the internal air temperature TRa under the state where steady air conditioning is being performed in connection with the internal air temperature TR. This is based on the fact that the dynamic model of the system is constructed by regarding the state of the air conditioning by the vehicle air conditioning apparatus as the continuance of regions where linear approximation is satisfied around a plurality of steady air conditioning states in order to perform linear approximation for a nonlinear model. Therefore, the internal air temperature TR is handled as a perturbation component $\delta TR \ (=TR-TRa)$ relative to a predetermined closest steady state. The controlled variables of the air conditioning unit 1 obtained by the above-mentioned integrator P2, the observer P4 and the feedback amount determining portion P5, i.e. the drive voltage VB of the blower motor 3 determining the variables of the blow off air, the drive voltage VC of the compressor 22, and the drive voltage VD of the damper actuator 24 which determines the opening degree of the air-mixing damper 9, are also handled as perturbation components $\delta VB$, $\delta VC$, and $\delta VD$.

The observer P4 obtains state estimated variables $\hat{X}(k)$ by estimating state variables $X(k)$ which represent the internal state of the air conditioning apparatus using the perturbation component $\delta TR$ of the internal air temperature and the perturbation components $\delta VB$, $\delta VC$, and $\delta VD$ of the above-mentioned controlled variables.

The feedback amount determining section P5 adds the first feedback amount, i.e., deviation-accumulated value, calculated by the integrator P2 to the second feedback amount obtained by multiplying the state estimated variable $\hat{X}(k)$ by the elements relating to the state estimated variable $\hat{X}(k)$ of the optimal feedback gain F so as to obtain the perturbation components $\delta VB(k)$, $\delta VC(k)$, and $\delta VD(k)$ of the controlled variables. The perturbation components $\delta VB(k)$, $\delta VC(k)$, and $\delta VD(k)$ of the controlled variables calculated by the feedback amount determining section P5 are perturbation components perturbed from the controlled variables corresponding to steady operating condition selected by the perturbation component extracting section P3. Therefore, the controlled variables VB, VC and VD of the air conditioning unit 1 are determined by adding reference setting values VBa, VCa and VDa corresponding to the steady operating condition to the perturbation components $\delta VB(k)$, $\delta VC(k)$, $\delta VD(k)$ by a reference setting value adding portion P6.

An initial state-determining section P7 is provided for determining whether the control of the air conditioning unit 1 is in the initial state, that is, the air conditioning unit 1 is in the condition that it is started to be controlled. When the initial state has been determined, the first feedback amount obtained by the integrator P2 is set to be equal to the second feedback amount and is inverted in terms of polarity. As a result of this process, in the initial state, in the feedback amount determining section P5, the first feedback amount and the second feedback amount are offset from each other and therefore all the perturbation components of the controlled variables become zero. Accordingly, the controlled variables are set to the reference set values VBa, VCa, VDa when it is in the initial state. This means that there is not the deviation-accumulated value of the previous operating state in the initial state of the control of the air conditioning unit 1. Therefore, it is prevented to use the perturbation components determined on the basis of the state estimated amount $\hat{X}(k)$ calculated in accordance with uncertain values and the reference set values predetermined in correspondance with the steady operating state are used as the controlled variables, resulting in stability in the control in the initial state.

While the structure of the control system has been briefly described, the reason for taking the drive voltage VB of the blower motor 3, the drive voltage VC of the compressor 22 and the drive voltage VD of the damper actuator 24 as the operating conditions of the air conditioner as embodiments is that these variables are basic values relating to the control of the internal air temperature TR in the air conditioner for automobile having an air conditioning unit 1 of air-mixing type. Therefore, in the present embodiment, the air conditioner is modeled as a multivariable system of three inputs and one output. In the case that the air conditioner for automobile is a reheat type, a control model of another multivariable system may be formed such that an opening degree of a water valve, which changes the flow rate of hot water circulating through a heater core, is used as one of the controlled variables.

Hereinabove, the hardware structure of the air conditioner for an automobile and the structure of the control system have been described taking a system of three inputs and one output as an example which controls the output of the air conditioner. Now it will be described about the construction of a dynamic model through actual system identification, the designing of the observer P4, and how to give the optimal feedback gain F.

Figure 4:
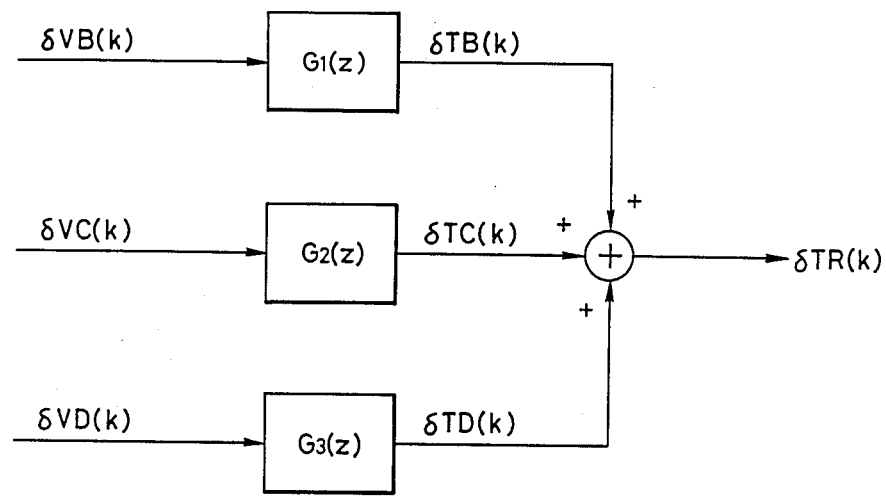
FIG. 4 is a block diagram used for identifying models of the system.

First of all, a dynamic model of an air conditioner for automobile is constructed. FIG. 4 is a diagram showing a system of an air conditioner under steady state operation as a system having three inputs and one output by way of transfer functions G1(z) through G3(z). The reference z indicates Z-transformation of sampled values of the input/output signals, and it is assumed that G1(z) through G3(z) have appropriate order. Therefore, entire transfer function matrix G(z) is given by:

$$G(z) = [G1(z)\ G2(z)\ G3(z)]$$

Here, the entire transfer function matrix G(z) is obtained in the vicinity of the basic operation of sampled value system at a predetermined interval and is linear-approximated.

When there exists an interference in the input/output variables, where the system is of three inputs and one output as in the air conditioner of this embodiment, it is extremely difficult to determine a physical model. In such a case, it is possible to obtain transfer function through a sort of simulation which is called system identification.

The method of system identification is described in detail in "System Identification" written by Setsuo SAGARA published by The Society of Instrument and Control Engineers (SICE) of Japan in 1981, and identification is performed here through least square method.

The air conditioning unit 1 is put in steady state operation, and a variation of $\delta VB$ of the drive voltage of the blower motor 3 is controlled by an appropriate test signal with both variations $\delta VC$ and $\delta VD$ of the drive voltages of the compressor 22 and the damper actuator 24 being made zero. The perturbation component $\delta VB$ of the drive voltage of the blower motor 3 as an input and data of a variation $\delta TR$ of the internal air temperature as an output at this time are sampled N times. This is expressed as input data series of $\{u(i)\}=\{\delta VBi\}$ and as output data series of $\{y(i)\}=\{\epsilon TRi\}$ wherein i=1, 2, 3 ... N. Here, the system can be regarded as having one input and one output, and thus the transfer function G1(z) is given by:

$$G1(z)=B(z^{-1})/A(z^{-1}) \tag{3}$$

Therefore, $$G1(z)=(b0+b1\cdot z^{-1}+\ldots +bn\cdot z^{-n})/(1+a1\cdot z^{-1}+a2\cdot z^{-2}+\ldots +an\cdot z^{-n}) \tag{4}$$

In the above, $z^{-1}$ is a unit shift operator indicating $z^{-1}x(k)=x(k-1)$.

When we determine parameters a1 to an and b0 to bn of Eq. (4) from the input and output data series $\{u(i)\}$ and $\{y(i)\}$, transfer function G1(z) can be obtained. These parameters are determined in system identification using least square method so that the following assumes a minimal value:

$$Jo = \sum_{k=0}^{N} [\{y(k) + a1 \cdot y(k-1) + \ldots + an \cdot y(k-n)\} - \{b0 \cdot u(k) + b1 \cdot u(k-1) + \ldots + bn \cdot u(k-n)\}]^2 \tag{5}$$

Figure 5:
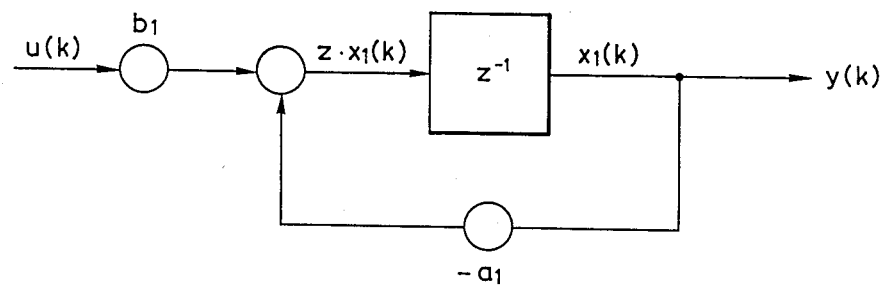
FIG. 5 is a signal flow diagram for obtaining transfer function.

In the present embodiment, respective parameters have been obtained assuming that n=1. In this case a signal flow diagram of the system is as shown in FIG. 5, and using X1(k) as a state variable, state and output equations thereof can be expressed by Eqs. (6) and (7):

$$X1(k+1) = z \cdot x1(k) = -a1 \cdot x1(k) + b1 \cdot u(k) \tag{6}$$

$$y(k) = x1(k) \tag{7}$$

$$y(k) = x1(k) \tag{7}$$

Therefore, using system parameters A1', B1', C1' for the parameters A, B, C in the case that the system is regarded as of one input and one output, we obtain:

$$A1' = -a1$$

$$B1' = b1 \tag{8}$$

$$C1' = 1$$

Through similar method transfer functions G2(z), G3(z) as well as system parameters A2', A3', B2', B3', C2', C3' can be obtained. Therefore, using these system parameters, the system parameter of the original multivariable system of three inputs and one output, namely, vectors A, B, C of state equation (1) and output equation (2) can be determined.

In this way, the dynamic model of the present embodiment is obtained through system identification, and this dynamic model can be determined in the form that linear approximation is satisfied around a state where the air conditioning unit 1 is operated under a given condition. Therefore, the transfer function G1(z) through G3(z) are respectively obtained through the above method in connection with a plurality of steady air conditioning states, and respective state equations (1) and output equations (2), i.e vectors A, B, C, are obtained where the relationship between input and output thereof is satisfied between perturbation components.

Now the way of designing the observer P4 will be described. While as the way of designing is the known Gopinaths' method, which is described in detail in "Basic System Theory" written by katsuhisa FURUTA and Akira SANO published from Corona Co. Ltd. in 1978, the observer is designed as a minimal order observer in this embodiment.

The observer P4 is used for estimating the internal state variable X(k) of the air conditioning unit 1 from the perturbation component ($\delta TR$) of the internal air temperature which is air conditioned and from perturbation components ($\delta VB$, $\delta VC$, $\delta VD$) of the controlled variables, and the reason why the state estimated variables X(k) obtained by the observer P4 can be handled as actual state variable X(k) in the control of the system will be made clear hereinbelow. Let us assume that the output X(k) from the observer P4 is constructed as the following Eq. (9) on the basis of the state equation (1) and the output equation (2):

$$\hat{X}(k)=(A-L\cdot C)\cdot \hat{X}(k-1)+B\cdot u(k-1)+L\cdot y(k-1) \tag{9}$$

In Eq. (9), L is a matrix arbrarily given. Modifying Eqs. (1), (2) and (9), we obtain:

$$[X(k) - \hat{X}(k)] = (A - LC)[X(k-1) - \hat{X}(k-1)] \tag{10}$$

Therefore, if the matrix L is selected so that an eigenvalue of the matrix (A−L·C) is located within a unit circle, $\hat{X}(k) \rightarrow X(k)$ with $k \rightarrow \infty$, and thus it is possible to accurately estimate the internal state variable X(k) of the controlled object using series u(*), y(*), from the past, of the input control vector u(k) (namely, the drive voltages [VB(k), VC(k), VD(k)] of the blower motor 3 and so on) and the output vector y(k) (namely, the internal air temperature TR(k) as a scalar y(k)).

Figure 6:
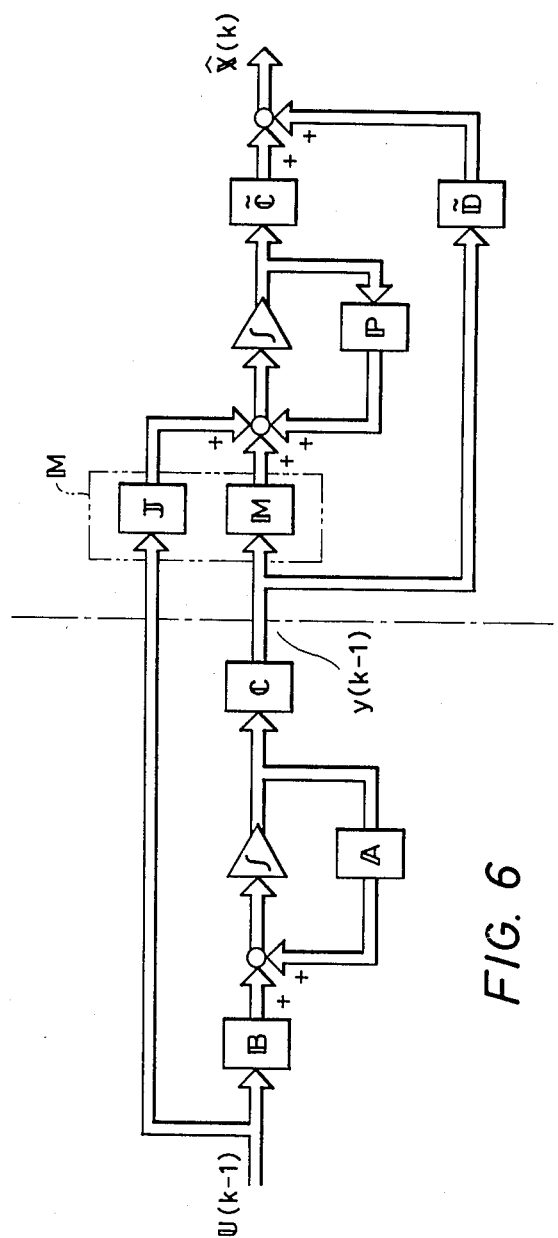
FIG. 6 is a block diagram showing the structure of a minimal order observer.

FIG. 6 is a block diagram showing the structure of the minimal order observer. As the observer is formed in this way, and when estimating that the internal state variable of the observer is W(k), it will be understood that the state estimated variable $\hat{X}(k-1)$ is obtained as follows:

$$W(k)=P\cdot W(k-1)+J\cdot u(k-1)+My(k-1) \tag{11}$$

$$\hat{X}(k-1)=\overline{C}\cdot W(k-1)+\overline{D}y(k-1) \tag{12}$$

The vector J can be arbitrarily selected under a specific condition, and a speed of convergence as $\hat{X}(k) \rightarrow X(k)$ can be altered. Here, Eq. (11) is rewritten using a vector M which unites the vectors J and M as follows:

$$W(k) = P \cdot W(k-1) + M[u(k-1)y(k-1)]^T \quad (13)$$

As described in the above, a detailed way of designing of such a minimal order observer is known from the Gopinaths' method of designing, and the following Eqs. are obtained in the present embodiment in connection with a given steady operating state of the air conditioning unit 1:

$$P = \begin{bmatrix} P11 & P12 \\ P21 & P22 \end{bmatrix} \quad (14)$$

$$M = \begin{bmatrix} M11 & M12 & M13 & M14 \\ M21 & M22 & M23 & M24 \end{bmatrix} \quad (15)$$

$$\tilde{C} = \begin{bmatrix} C11 & C12 \\ C21 & C22 \end{bmatrix} \quad (16)$$

$$\tilde{D} = \begin{bmatrix} D1 \\ D2 \end{bmatrix} \quad (17)$$

Here, $\delta TB(k)$, $\delta TC(k)$, $\delta TD(k)$ are considered as the state estimated variable $\hat{X}(k)$ obtained by the observer, i.e. the variables indicating the internal state of the air conditioning unit 1. The variable $\delta TB(k)$ indicates perturbation component of the actual temperature within vehicle compartment which temperature is affected by the drive voltage VB controlling the blow off airflow rate from the blower motor 3, the variable $\delta TC(k)$ indicating in a similar manner perturbation component of the actual temperature within vehicle compartment which temperature is affected by the drive voltage VC of the compressor 22, and the variable $\delta TD(k)$ indicating in a similar manner perturbation component of the actual temperature within vehicle compartment which temperature is affected by the damper actuator 24. Namely, the state estimated variable X (k) is given by:

$$\hat{X}(k) = [\delta TB(k) \delta TC(k) \delta TD(k)]^T \quad (18)$$

Now the way of obtaining the optimal feedback gain F will be described. Since the way of obtaining optimal feedback gain F is described in detail in the above-mentioned "Linear System Control Theory", only the results are shown here with the detail thereof being omitted.

Using $$\delta u(k) = u(k) - u(k-1)$$

$$\delta y(k) = y(k) - y(k-1)$$

around a steady-state point in connection with the control input $u(k) = [VB(k)VC(k)VD(k)]^T$ and an output $y(k) = TR(k)$ thereof, obtaining an optimal control input, i.e. operating condition u(k), which makes the following performance function J minimal, results in solving a control problem as an integral-added optimal regulator related to the control system of the air conditioning unit 1.

$$J = \sum_{k=0}^{\infty} [X^T(k) \cdot Q \cdot X(k) + \delta u^T(k) \cdot R \cdot \delta u(k)] \quad (19)$$

In the above, Q and R indicate weighting parameter matrices, and k indicates the number of sampling times which is zero at the time of beginning of control, while the right side of the Eq. (19) is an expression of so called quadratic performance index using diagonal matrixes of Q and R.

Here, the optimal feedback gain F is given as follows:

$$F = (R + \bar{B}^T \cdot S \cdot \bar{B})^{-1} \cdot \bar{B}^T \cdot S \cdot \bar{A} \quad (20)$$

In Eq. (20), A and B are given by:

$$\bar{A} = \begin{bmatrix} 1 & -C \cdot A \\ 0 & A \end{bmatrix} \quad (21)$$

$$\bar{B} = \begin{bmatrix} -C \cdot A \\ B \end{bmatrix} \quad (21)$$

Furthermore, S is a solution of the following discrete-type Riccati equation:

$$S = \bar{A}^T \cdot S \cdot \bar{A} - \bar{A}^T \cdot S \cdot \bar{B} \cdot (\bar{B}^T \cdot S \cdot \bar{B} + R)^{-1} \cdot \bar{B}^T \cdot S \cdot \quad (23)$$

$$\bar{A} + \begin{bmatrix} Q & 0 \\ 0 & 0 \end{bmatrix}$$

In the above, the performance function J in Eq. (19) has a meaning that it is intended to reduce the deviation from the control output y(k), i.e. the target temperature TR(k)* of the internal air temperature TR(k), with the variation of controlled variables $u(k) = [VB(k)VC(k)VD(k)]^T$ as the control inputs to the air conditioning unit 1 being regulated. The weighting of regulation of the controlled variables u(k) can be altered by changing the values of the weighting parameter matrixes Q and R. Therefore, the state variables $\hat{X}(k)$ can be obtained as state estimated variables X(k) using Eqs. (12) and (13) if we obtain the optimal feedback gain F using Eq. (20) by obtaining S solving Eq. (23) with arbitrarily weighting parameter matrixes Q, R being selected using the dynamic model of the air conditioning unit 1, i.e. matrixes A, B, C which is obtained in advance.

As described above, the deviation-accumulated values ZTRB(k), ZTRC(k), ZTRD(k) which are the first feedback amount are calculated by accumulating the value obtained by multiplying the deviation between the target temperature TR* and the vehicle's internal air temperature TR by the respective elements F14, F24, F34 relating to the deviation of the above-mentioned optimal feedback gain. Secondly, the second feedback amount is calculated by multiplying the state estimated variables $\hat{X}(k)$ by elements Fij(i=1 to 3, j=1 to 3) relating to the state estimated variables $\hat{X}(k)$ of the above-mentioned optimal feedback gain, and the perturbation components of the controlled variables u(k) of the air conditioning unit 1, i.e., $\delta VB(k)$, $\delta VC(k)$, $\delta VD(k)$, can be obtained by respectively adding the first feedback amount to the calculated second feedback amount.

By repeating simulation with the weighting parameter matrixes Q and R being altered until an optimal control characteristic is obtained, the optimal feedback gain F is obtained as:

$$F = \begin{bmatrix} F11 & F12 & F13 & F14 \\ F21 & F22 & F23 & F24 \\ F31 & F32 & F33 & F34 \end{bmatrix} \quad (24)$$

While it has been described about the construction of the dynamic models of the control system of the air conditioning unit 1 made through system identification using least square method, the designing of minimal order observer and the computation of the optimal feedback gain F, these respective parameters P, M, $\bar{C}$, $\bar{D}$ as well as the optimal feedback gain F are obtained in advance so that actual control is performed within the electronic circuit unit 20 using only the results thereof.

Figure 7:
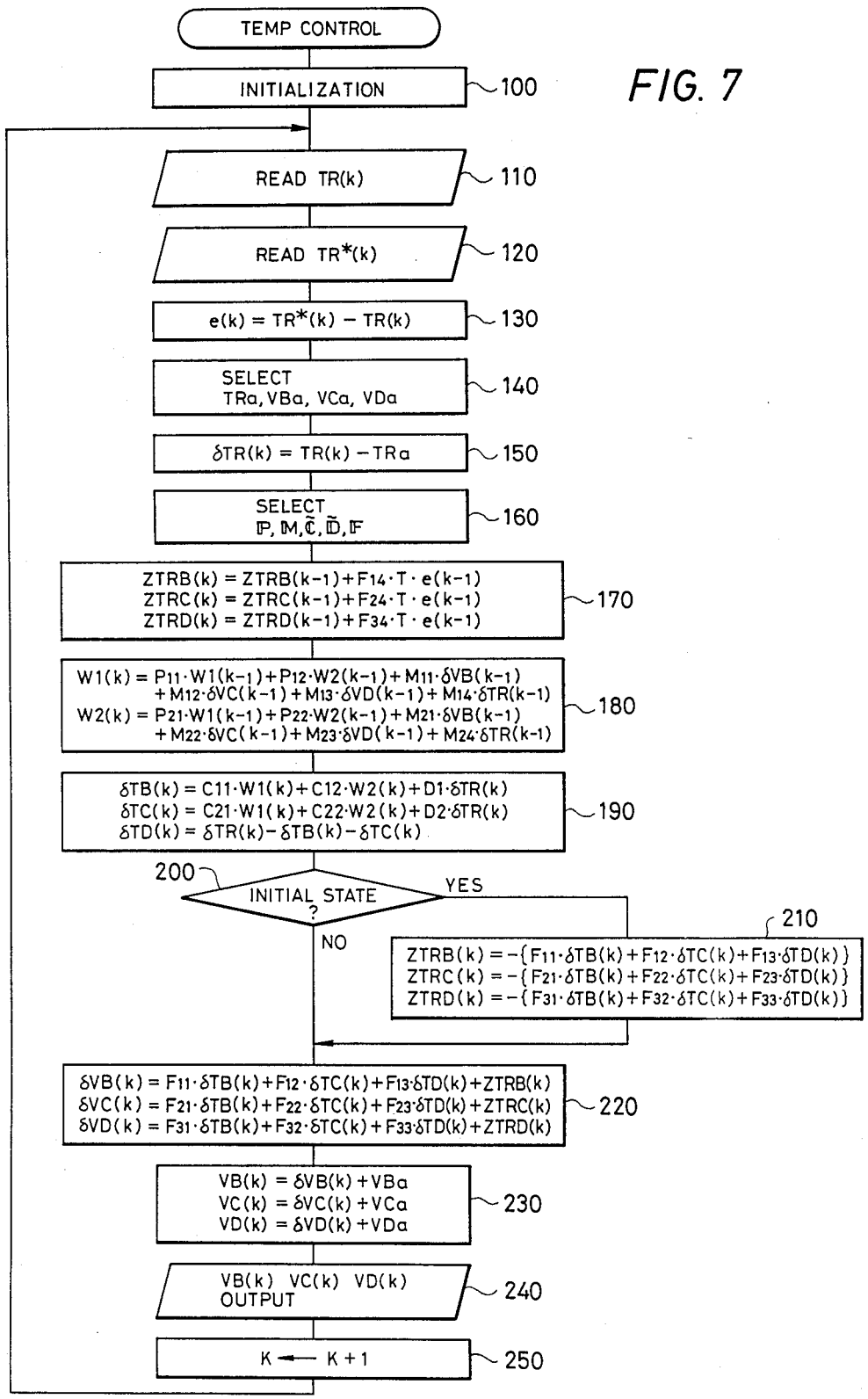
FIG. 7 is a flow chart showing the control in the first embodiment.

Now, an internal air temperature control actually performed by the electronic circuit 20 will be described with reference to a flowchart of FIG. 7. In the following description, an amount handled in a present processing is expressed by a subscript (k) and an amount handled in an immediately former cycle by another subscript (k−1).

After the air conditioner starts operating, the CPU 30 performs initializing processing, such as the clearing of the internal register of CPU 30, setting of initial controlled variables, resetting of an initial state flag FS to zero indicating that this process is the first time, and so on, in step 100, and then repeats the execution of steps 110 through 250, which will be described hereinlater, in accordance with procedure prestored in the ROM 32 in advance. In this vehicle compartment temperature control routine, the above-mentioned values of P, M, $\bar{C}$, $\bar{D}$, F which are prestored in the ROM 32, are used.

In the step 110, the output signal from the internal air temperature sensor 12 is inputted via the input port 36 to read internal air temperature TR(k). In a step 120, an output signal from the temperature setter 14 is inputted in a similar manner to read the target temperature TR*(k). The process of this step 120 acts as the target temperature setting section P1 shown in FIG. 3.

In a subsequent step 130, a error between the internal air temperature TR(k) read in step 110 and the target temperature TR*(k) read in step 120 is obtained as $e(k) = TR*(k) - TR(k)$. In a step 140, a nearest state (which will be referred to as steady-state points TRa, VBa, VCa, VDa) among steady-state operating conditions of the air conditioning unit 1, which are taken as satisfying linear approximation when the dynamic model of the air conditioning unit 1 is constructed from the internal air temperature TR(k) read in step 110, is obtained. In a step 150, a perturbation component δTR(k) relative to the steady-state point determined in step 140 is obtained in connection with the internal air temperature TR(k) read in step 110. It is assumed that values of the perturbation component, including δTR(k−1), of former cycle execution of this control routine is preserved. The processing by these steps 140 and 150 corresponds to the perturbation component extracting section P3 of FIG. 3.

In a following step 160, parameters P, M, $\bar{C}$, $\bar{D}$ within the observer corresponding to the present operating condition of the air conditioning unit 1 as well as the optimal feedback gain F and so on are selected.

In a step 170, a process is executed as follows to accumulate the value obtained by multiplying the error e(k−1) previously obtained in the step 130 by the element relating to the deviation of the optimal feedback gain F selected in the step 160 and to calculate the deviation-accumulated values ZTRB(k), ZTRC(k), ZTRD(k). Here, the values of ZTRB(k−1), ZTRC(k−1), ZTRD(k−1) in the initial state are respectively set to zero in the step 100. Furthermore, the reason that e(k−1) is used as the deviation is that the calculating time lag in this process is considered. The processes of the steps 130 and 170 correspond to the integrator P2 shown in FIG. 3.

$$ZTRB(k) = ZTRB(k-1) + F14 \cdot T \cdot e(k-1)$$

$$ZTRC(k) = ZTRB(k-1) + F24 \cdot T \cdot e(k-1)$$

$$ZTRD(k) = ZTRD(k-1) + F34 \cdot T \cdot e(k-1)$$

Subsequent steps 180 and 190 are provided for computing the state estimated variables X(k), and [δTB(k) δTC(k)δTD(k)]$^T$ is obtained using Eq. (12) and (13). In detail in step 180, using a variable $W(k) = [W1(k) W2(k)]^T$, W1(k) and W2(k) are respectively given as:

$$W1(k) = P11 \cdot W1(k-1) + P12 \cdot W2(k-1) + M11 \cdot \delta VB(k-1) + M12 \cdot \delta VC(k-1) + M13 \cdot \delta VD(k-1) + M14 \cdot \delta TR(k-1)$$

$$W2(k) = P21 \cdot W1(k-1) + P22 \cdot W2(k-1) + M21 \cdot \delta VB(k-1) + M22 \cdot \delta VC(k-1) + M23 \cdot \delta VD(k-1) + M24 \cdot \delta TR(k-1)$$

Then in a following step 190, state estimated variables are obtained using the results of the step 180 as:

$$\delta TB(k) = C11 \cdot W1(k) + C12 \cdot W2(k) + D1 \cdot \delta TR(k)$$

$$\delta TC(k) = C21 \cdot W1(k) + C22 \cdot W2(k) + D2 \cdot \delta TR(k)$$

$$\delta TD(k) = \delta TR(k) - \delta TB(k) - \delta TC(k)$$

In the above, δVB(k−1), δVC(k−1), δVD(k−1), δTR(k−1) and so on which are used in step 180 are of the values of the former cycle execution of this control routine as described in the above. Furthermore, the reason for obtaining δTD(k) which is one of the state estimated variables X(k), namely, the perturbation component δTD(k) of the temperature affecting the perturbation component δTR(k) of the internal air temperature by the perturbation component δVD(k) of the drive voltage of the damper actuator 24 which controls the opening degree of the air-mixing damper 9, as δTR(k)−δTB(k)−δTC(k), is to simplify the computation so as to improve the processing speed since the perturbation component δTR(k) of the internal air temperature is already measured (step 150). The processes of the steps 180 and 190 correspond to the observer P4 of FIG. 3.

In a following step 200, it is checked according to the initial state flag FS whether the control is in the initial state. Since the initial state flag FS is reset to zero in the step 100, a step 210 is executed. The process of the step 200 corresponds to the initial state decision section P7.

In the step 210 executed only in the initial state, the deviation-accumulated values are set as follows.

$$ZTRB(k) = -\{F11 \cdot \delta TB(k) + F12 \cdot \delta TC(k) + F13 \cdot \delta TD(k)\}$$

-continued $$ZTRC(k) = -\{F21 \cdot \delta TB(k) + F22 \cdot \delta TC(k) + F23 \cdot \delta TD(k)\}$$

$$ZTRD(k) = -\{f31 \cdot \delta TB(k) + F32 \cdot \delta TC(k) + F33 \cdot \delta TD(k)\}$$

Thereafter, the initial state flag FS is set to 1, followed by a step 220. In the case of initial state, the step 200 is followed by the step 210. On the other hand, in the case of no initial state, the step 200 is followed by the step 220.

In the step 220, the perturbation component $\delta VB(k)$ of the drive voltage of the blower motor 3, the perturbation component $\delta VC(k)$ of the drive voltage of the compressor 22, and the perturbation component $\delta VD(k)$ of the drive voltage of the damper actuator 24 are obtained by multiplying the state estimated variables $\hat{X}(k)=[\delta TB(k)\delta TC(k)\delta TD(k)]^T$ obtained in the steps 180 and 190 by the elements relating to the state estimated variables $\hat{X}(k)$ of the optimal feedback gain F selected in the step 160 and further adding the deviation-accumulated values obtained in the step 170 or 210. Namely, the following processes are performed.

$$\delta VB(k) = F11 \cdot \delta TB(k) + F12 \cdot \delta TC(k) + F13 \cdot \delta TD(k) + ZTRB(k)$$

$$\delta VC(k) = F21 \cdot \delta TB(k) + F22 \cdot \delta TC(k) + F23 \cdot \delta TD(k) + ZTRC(k)$$

$$\delta VD(k) = F31 \cdot \delta TB(k) + F32 \cdot \delta TC(k) + F33 \cdot \delta TD(k) + ZTRD(k)$$

The process of the step 220 corresponds to the function of the feedback amount determining section P5 shown in FIG. 3. In the case of initial state, since the deviation-accumulated values are set in the step 210, the respective perturbation components $\delta VB(k)$, $\delta VC(k)$, $\delta VD(k)$ obtained in accordance with the above-mentioned calculation are offset and become zero. On the other hand, in the case of no initial state, since the deviation-accumulated values are calculated in the step 170, the respective perturbation components $\delta VB(k)$, $\delta VC(k)$ $\delta VD(k)$ assume predetermined values.

In a step 230, actual drive voltages VB(k), VC(k), VD(k) are obtained by adding values VBa, VCa, VDa at steady-state point to the perturbation components $\delta VB(k)$, $\delta VC(k)$, $\delta VD(k)$ of respective drive voltages obtained in step 220. This processing corresponds to the reference value adding section P6 of FIG. 3.

In a following step 240, respective drive voltages VB(k), VC(k), VD(k) obtained in step 230 are outputted via the output port 38 to the blower motor 3, the compressor 22 and the damper actuator 24. In a step 250, the value of subscript k indicating the number of times of sampling operation control is incremented (renewed) by 1 to return to step 110 so as to repeat the processing of steps 110 through 250.

Figure 8:
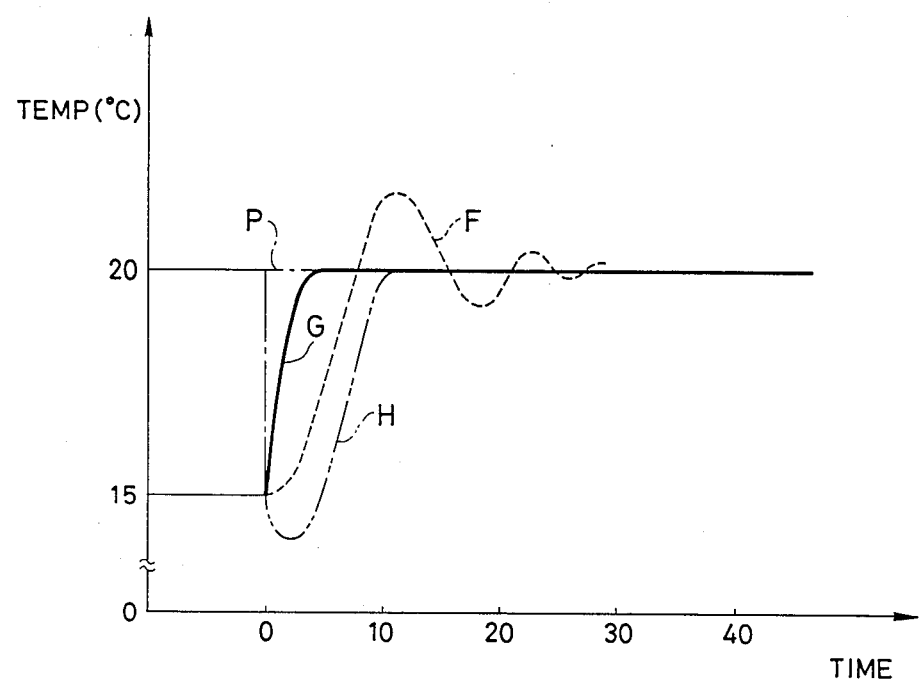
FIG. 8 is a graphic illustration for comparison between the control of the first embodiment and a conventional control for air conditioning.

The control performed according to the present vehicle-inside temperature control formed as described in the above, is shown in FIG. 8 in comparison with a conventional example of simple feedback control. As an example of control is taken a case where a target temperature TR* is set to 20° C. when the internal air temperature TR is 15° C. This target temperature is shown by a dot-dash line P in FIG. 8, and the change in the internal air temperature is plotted along a solid line G, a broken line F and a two-dot chain line H on the basis of an output signal from the internal air temperature sensor 12. The solid line G shows an example of control of the internal air temperature according to the present embodiment, the broken line F shows an example of control by the conventional control, and the two-dot chain line H shows an example of control where the determination is not performed with respect to the initial state. As is apparent from FIG. 8 the present embodiment actualizes a response characteristic (rising) which is quicker than that of conventional control, and is capable of adjusting the internal air temperature TR to a target temperature TR* without substantially suffering from overshoot or undershoot. Comparing duration required for the system, being air-conditioned, to become stable, it will be understood that the present embodiment has improved by one or more degrees of magnitude even though the rising is quick. In addition, it will be also understood that since the deviation-accumulated values are absent in the initial state when the perturbation component of each the drive voltages is calculated on the basis of the state estimated variables $\hat{X}(k)$ in the initial state, the state estimated variables $\hat{X}(k)$ assume uncertain values. Therefore, for example, as indicated by the two-dot chain line H, it may be disadvantageous that the control is started in the direction reverse to the target temperature TR*. On the other hand, as this embodiment, when the control is started on the basis of the reference set valuess VBa, VCa, VDa on steady-state point, it quickly approaches the target temperature TR* from the initial state as indicated by the solid line G. Thereby, not only it is possible to control the temperature within a vehicle compartment to a target temperature with satisfactory response, but also the blower motor 3, compressor 22, damper actuator 24 are optimally controlled so as to prevent energy from being wasted. Furthermore, since the compressor 22 is not on-off controlled, it is possible to reduce the fluctuation of output torque of the internal combustion engine.

This is because the present embodiment is constructed such that control is performed using estimated information relating to the past history. This past history is necessary and sufficient for predicting the state of the controlled object, that is the influence on the future, through an experimental analysis of the controlled object, i.e. system where air conditioning is to be performed, through system identification by constructing the control apparatus by way of the electronic circuit 20 as an integral-added optimal regulator in place of simple feedback control based on predicted thermal equilibrium. Furthermore, because the control is performed using the reference set values on steady-state point of the model of the system in the initial state, while it is performed using the estimated variables after the start of control.

In addition, in this embodiment, when the deviation-accumulated values ZTRB(k), ZTRC(k), ZTRD(k) are calculated, the error e(k−1) previously sampled and calculated is used as the deviation. Therefore, it is possible to compensate for the calculating time lag of the electronic circuit 20 on a discrete-time system.

In the air conditioner for automobile according to the present embodiment, the designing of the feedback gain in the electronic circuit 20, which controls the internal air temperature, is carried out extremely logically to determine the same. Therefore, the process of setting the feedback gain through designing on the basis of experience of a designer as in the designing of conventional control apparatus so as to perform actual adjustment if necessary is not required thereby it is possible to reduce designing and development process and cost.

In this embodiment, the air conditioning unit 1 corresponds to the air conditioning means M1. The temperature setting device 14, electronic circuit and the process (step 120) performed by the electronic circuit 20 correspond to the function of the temperature setting means M2. The internal air temperature sensor 12, electronic circuit 20 and the process (step 110) executed by the electronic circuit 20 correspond to the function of the temperature detecting means M3. The electronic circuit 20 and the processes (steps 140, 150, 160, 210) executed by the electronic circuit 20 correspond to the control means M4. The elecronic circuit 20 and the process (step 200) executed thereby correspond to the decision means M5. The electronic circuit 20 and the processes (steps 180, 190) performed thereby correspond to the state observer M6. The electronic circuit 20 and the processes (steps 130 and 170) performed thereby correspond to the first feedback amount calculating section M7. The electronic circuit 20 and the processes (steps 220, 230, 240) executed thereby correspond to the feedback controlled-variable calculating section M8.

Second Embodiment

Figure 9:
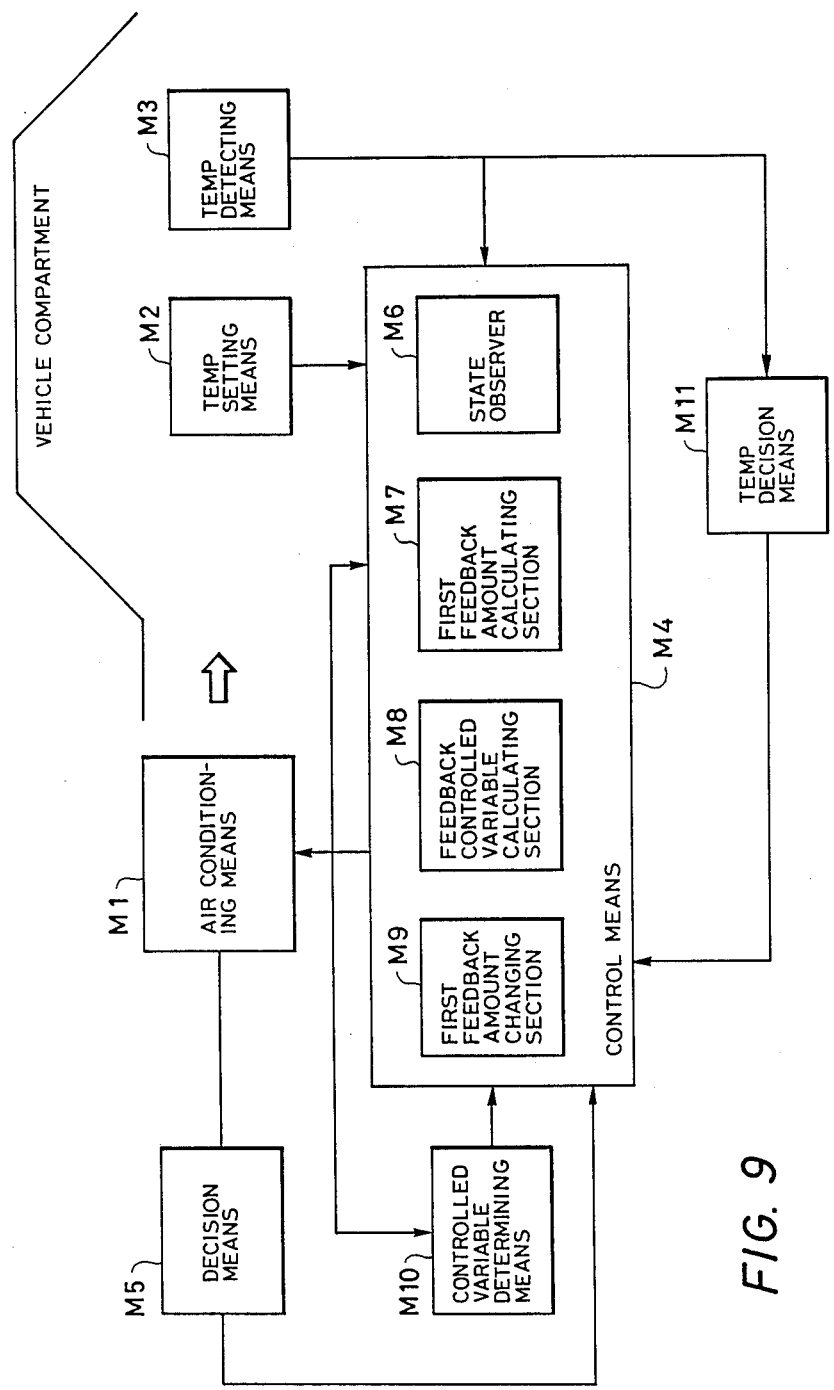
FIG. 9 is a basic structural diagram of an air conditioner according to a second embodiment of the present invention.

Referring to FIG. 9, there is schematically illustrated a construction of the air conditioner according to a second embodiment of the present invention. A detailed description in terms of portions and parts corresponding to those of the first embodiment will be omitted for brevity.

The air conditioner according to the second embodiment generally comprises air-conditioning means M1 which controls at least temperature of the blow off air discharged into a vehicle compartment in accordance with controlled variables from the outside, temperature setting means M2 for setting a target temperture within the vehicle compartment, temperature detecting means M3 for detecting the temperature within the vehicle compartment, and control means M4 formed as an integral-added optimal regulator for feedback-controlling the air conditioning means M1 using an optimal feedback gain predetermined in accordance with a dynamic model of the system relating to an air conditioning for a motor vehicle so that the internal air temperature is equal to the target temperature, decision means M5 for determining whether the air conditioning means M1 is in the initial state, controlled-variable determining means M10 for determining whether the controlled variables to the air conditioning means 1 are within a predetermined range, and temperature decision means M11 for determining whether the internal air temperature within the compartment of a vehicle corresponds to a target temperature near-by condition. The control means M4 includes a state observer M6 for estimating state variables indicating the dynamic internal state of the system on the basis of the controlled variables to the air-conditioning means M1 and the internal air temperature of the vehicle compartment using parameters predetermined in accordance with the dynamic model of the air conditioning system, a feedback amount calculating section M7 for calculating a first feedback amount relating to the controlled variables to the air conditioning means M1 on the basis of elements connected to the deviation of the internal air temperature from the target temperature and the deviation of the optimal feedback gain and for accumulating the calculated first feedback mount, a feedback controlled-variable calculating section M8 for outputting to the air-conditioning means M1 the controlled variable which is sum of the accumulated first feedback amount and a second feedback amount obtained from the elements relating to the state variables and the state variables of the optimal feedback gain, and a first feedback amount changing section 9 for correcting the accumulated first feedback amount so that the controlled variables are set to the limits of the predetermined range when the controlled-variable determining means M10 determines that the controlled variables are not within the predetermined range and the temperature decision means M11 determines that the internal air temperature corresponds to the target temperature near-by condition.

In the above, the controlled-variable determining means M10 is provided for determining whether the controlled variables to the air conditioning means M1 are within a predetermined range. For example, it can be arranged so as to output the results obtained by comparing drive voltages applied to a blower motor, a compressor, air-mixing damper and so on with the upper limits or lower limits of predetermined voltages for normally driving the devices.

The temperature decision means M11 is provided for determining whether the internal air temperature corresponds to a target temperature approach condition. For example, it is appropriate to determine the correspondence to the target temperature near-by condition when the internal air temperature approaches within a predetermined limit with respect to a target temperature. It is also appropriate to be arranged to determine the correspondence thereto when the internal air temperature is coincident with the target temperature. Still further, it is appropriate to be arranged to determine the correspondence thereto when the rate of change in process that the internal air temperature approaches the target temperature becomes between a predetermined upper limit and a predetermined lower limit.

The controlled variable determining means M10 and the temperature decision means M11, for example, can be realized as discrete logic circuits which are independent of each other. Furthermore, both may be realized in accordance with predetermined processes using a known CPU and its associated units such as ROM and RAM.

Furthermore, the first feedback amount changing section M9 of the control means M4 is arranged to correct the accumulated first feedback amount so that the controlled variables are set to the limits of the predetermined range when the controlled-variable determining means M10 determines that the controlled variables are not within the predetermined range and the temperature decision means M11 determines that the internal air temperature corresponds to the target temperature near-by condition. For example, it may be constructed to change the first feedback amount so that it assumes the sum of the amount corresponding to the above-mentioned limit and an amount whose value is equal to that of the second feedback amount and whose polarity is reverses to that of the second feedback amount.

Figure 10:
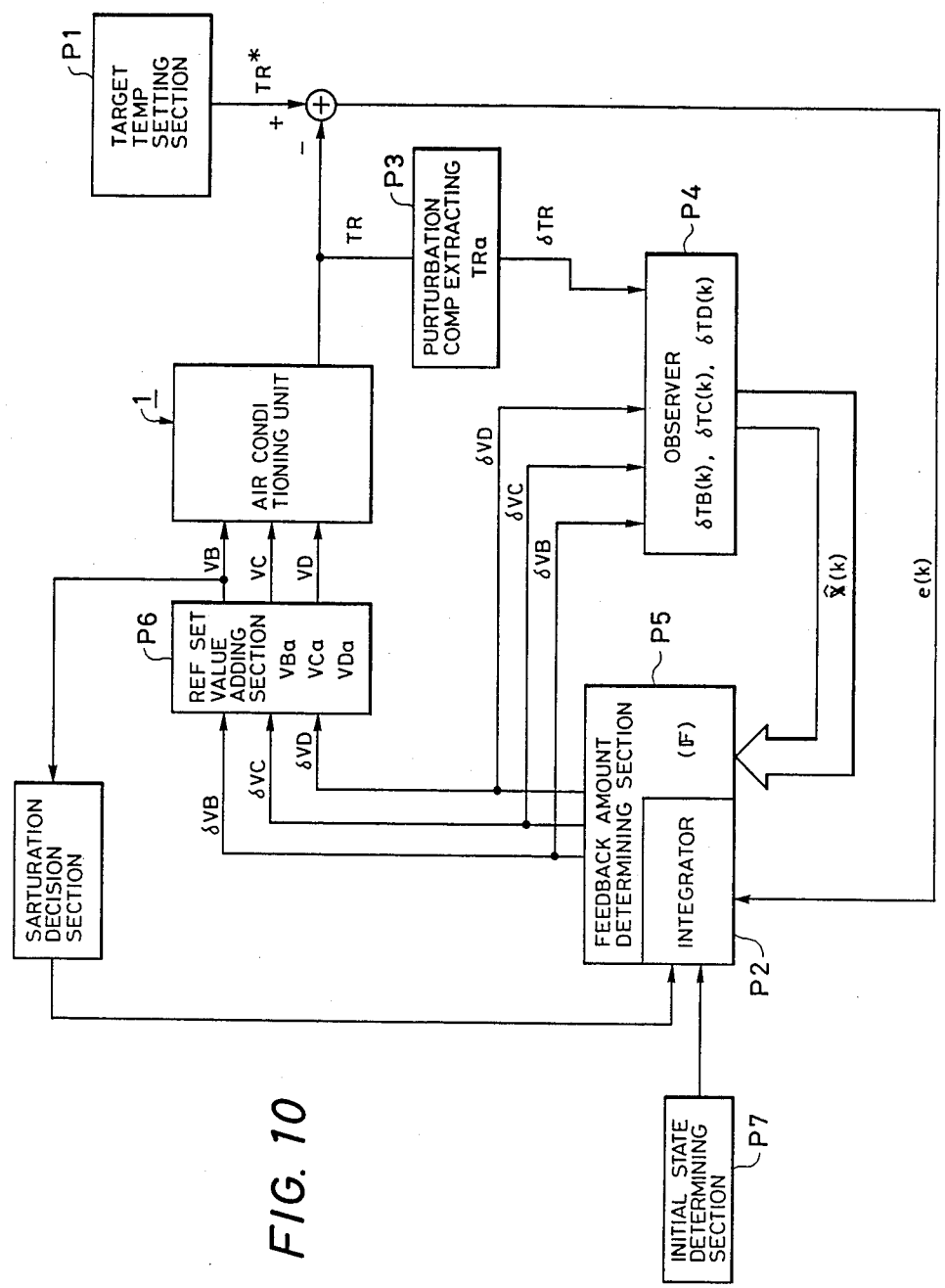
FIG. 10 is a control system diagram of another system where air conditioning is performed.

FIG. 10 is a control system diagram showing a control model of a system according to the second embodiment of the present invention. As described in connection with the first embodiment, FIG. 10 just shows the control system, and therefore it does not show hardware structure. The control system shown in FIG. 10 is actualized by executing a series of programs which will be described hereinafter.

This control system shown in FIG. 10 is similar to the control system of the first embodiment shown in FIG. 3 with the exception that it includes as saturation decision section P8. The saturation decision section P8 is provided for determining whether controlled variables (in this embodiment, drive voltage of the blower motor 3) are within a predetermined range determined in accordance with a maximum value VBmax and a minimum value VBmin. The maximum value VBmax is an upper limit representing that the air blasting amount of the blower motor 3 is not increased irrespective of application of a greater drive voltage VB thereto. On the other hand, the minimum value VBmin is a lower limit representing that the air blasting amount thereof is not decreased irrespective of application of a smaller drive voltage VB. Both are determined in advance.

When the saturation decision section P8 determines that the controlled variable VB calculated in the feedback amount determining section P5 is not within the predetermined range and the error e(k) of the internal air temperature TR from the target temperature TR* is below a reference value Tx, the deviation-accumulated value ZTRB, i.e., the first feedback amount, calculated in the integrator P2, is changed to be the sum of the amount, whose value is equal to that of the second feedback amount calculated in the feedback amount determining section P5 and whose sign is reverse to that of the second feedback amount, and the maximum perturbation component $\delta$VBmax or the minimum perturbation component $\delta$VBmin corresponding to the maximum value VBmax or the minimum value VBmin. Therefore, in the above-mentioned case, the controlled variable outputted from the feedback amount determining section P5 becomes the maximum perturbation component $\delta$VBmax or the minimum perturbation component $\delta$VBmin, and the maximum value VBmax or the minimum value VBmin is outputted from the reference set value adding section P6 to the air conditioning unit 1.

Figure 11A:
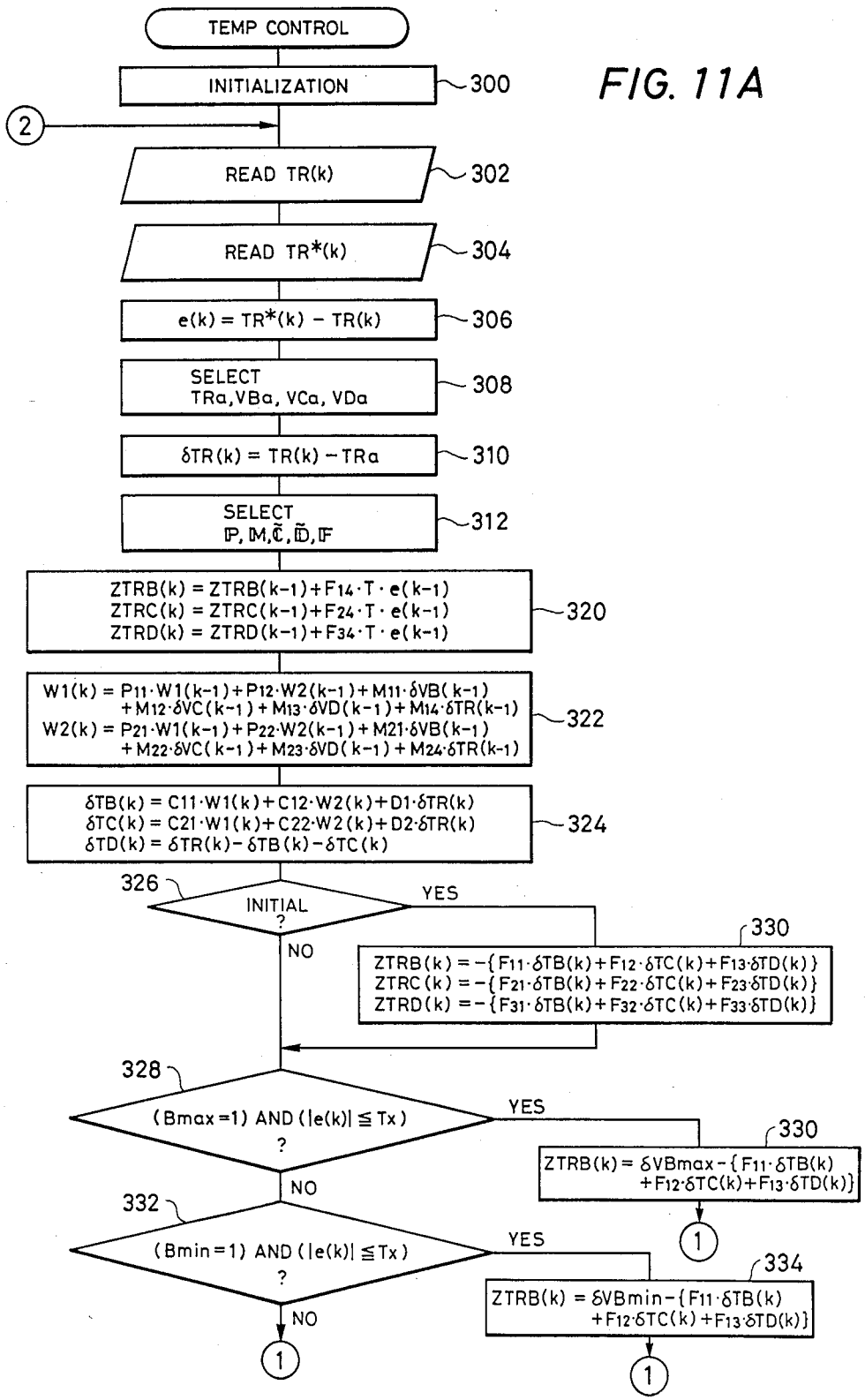
FIGS. 11A and 11B are flow charts showing the control performed in the second embodiment.
Figure 11B:
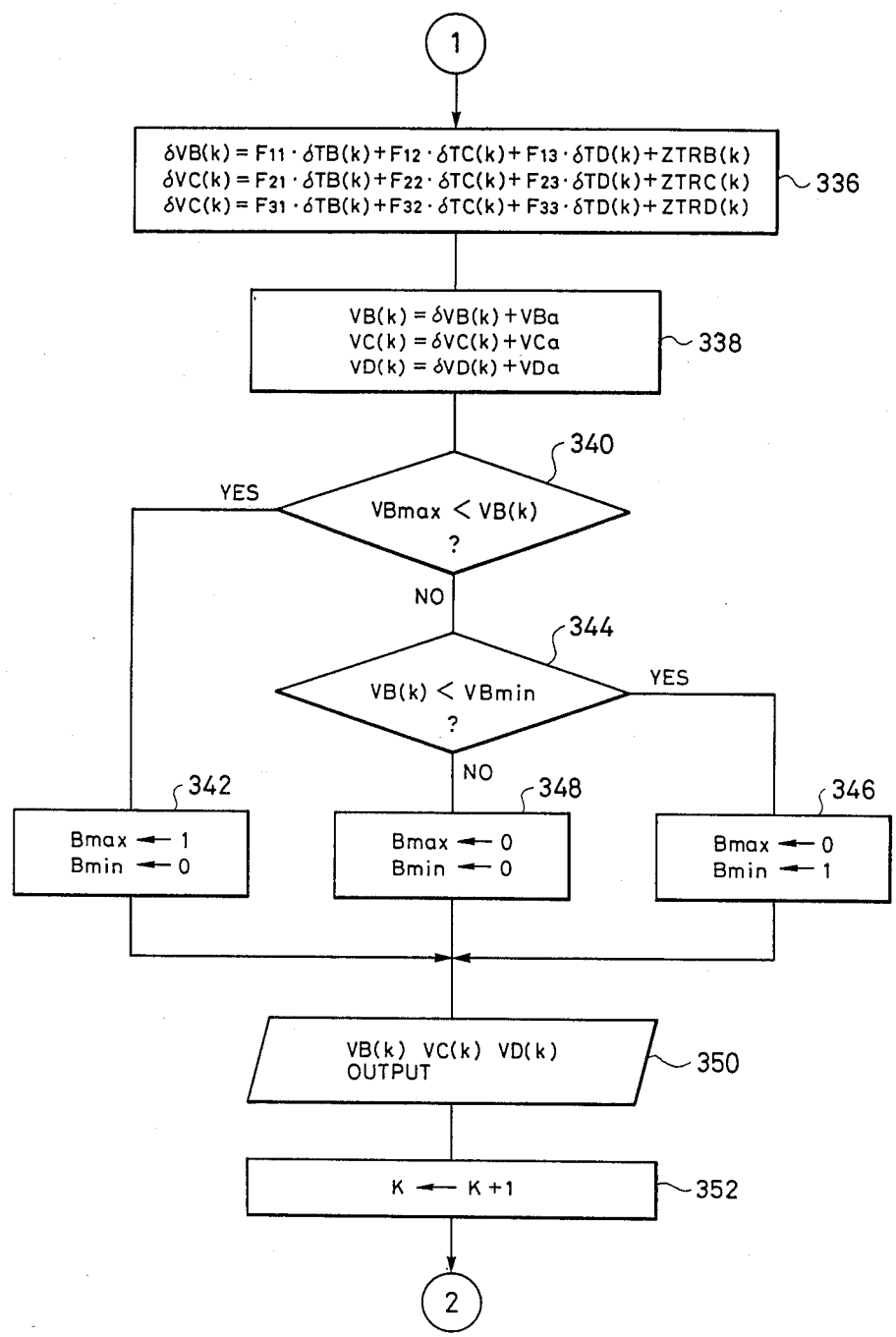

FIGS. 11A and 11B are flow charts used for the second embodiment of the present invention. In the following description, an amount handled in a present processing is expressed by a subscript (k) and an amount handled in an immediately former cycle by another subscript (k−1).

After the air conditioner starts operating, the CPU 30 performs initializing processing, such as the clearing of the internal register of CPU 30, setting of initial controlled variables, resetting of an initial state flag FS to zero indicating that this process is the first time, resetting of a maximum value flag Bmax and a minimum value flag Bmin, and so on, in step 300, and then repeats the execution of steps 302 through 352, which will be described hereinlater, in accordance with procedure prestored in the ROM 32 in advance. In this vehicle compartment temperature control routine, the above-mentioned values of P, M, $\bar{C}$, $\bar{D}$, F which are prestored in the ROM 32, are used.

In the step 302, the output signal from the internal air temperature sensor 12 is inputted via the input port 36 to read internal air temperature TR(k). In a step 304, an output signal from the temperature setter 14 is inputted in a similar manner to read the target temperature TR*(k). The process of this step 304 acts as the target temperature setting section P1 shown in FIG. 10.

In a subsequent step 306, an error between the internal air temperature TR(k) read in step 302 and the target temperature TR*(k) read in step 304 is obtained as $e(k) = TR^*(k) - TR(k)$. In a step 308, a nearest state (which will be referred to as steady-state points TRa, VBa, VCa, VDa) among steady-state operating conditions of the air conditioning unit 1, which are taken as satisfying linear approximation when the dynamic model of the air conditioning unit 1 is constructed from the internal air temperature TR(k) read in step 302, is obtained. In a step 310, a perturbation component $\delta$TR(k) relative to the steady-state point determined in the step 308 is obtained in connection with the internal air temperature TR(k) read in step 302. It is assumed that values of the perturbation component, including $\delta$TR(k−1), of former cycle execution of this control routine is preserved. The processing by these steps 308 and 310 corresponds to the perturbation component extracting section P3 of FIG. 10.

In a following step 312, parameters P, M, $\bar{C}$, $\bar{D}$ within the observer corresponding to the present operating condition of the air conditioning unit 1 as well as the optimal feedback gain F and so on are selected.

In a step 320, a process is executed as follows to accumulate the value obtained by multiplying the error e(k−1) previously obtained in the step 306 by the sampling time T (the repeated time of the routine of FIGS. 11A and 11B) and further multiplying the element relating to the deviation of the optimal feedback gain F selected in the step 312 and to calculate the deviation-accumulated values ZTRB(k), ZTRC(k), ZTRD(k). Here, the values of ZTRB(k−1), ZTRC(k−1), ZTRD(k−1) in the initial state are respectively set to zero in the step 300. Furthermore, the reason that e(k−1) is used as the deviation is that the calculating time lag in this process is considered. The processes of the steps 306 and 320 correspond to the integrator P2 shown in FIG. 10.

$$ZTRB(k) = ZTRB(k-1) + F14 \cdot T \cdot e(k-1)$$

$$ZTRC(k) = ZTRB(k-1) + F24 \cdot T \cdot e(k-1)$$

$$ZTRD(k) = ZTRD(k-1) + F34 \cdot T \cdot e(k-1)$$

Subsequent steps 322 and 324 are provided for computing the state estimated variables $\hat{X}(k)$, and $[\delta TB(k) \delta TC(k) \delta TD(k)]^T$ is obtained using Eq. (12) and (13). In detail in step 322, using a variable $W(k) = [W1(k) W2(k)]^T$, W1(k) and W2(k) are respectively given as:

$$W1(k) = P11 \cdot W1(k-1) + P12 \cdot W2(k-1) + M11 \cdot \delta VB(k-1) + M12 \cdot \delta VC(k-1) + M13 \cdot \delta VD(k-1) + M14 \cdot \delta TR(k-1)$$
$$W2(k) = P21 \cdot W1(k-1) + P22 \cdot W2(k-1) + M21 \cdot \delta VB(k-1) + M22 \cdot \delta VC(k-1) + M23 \cdot \delta VD(k-1) + M24 \cdot \delta TR(k-1)$$

Then in a following step 324, state estimated variables are obtained using the results of the step 322 as:

$$\delta TB(k) = C11 \cdot W1(k) + C12 \cdot W2(k) + D1 \cdot \delta TR(k)$$

$$\delta TC(k) = C21 \cdot W1(k) + C22 \cdot W2(k) + D2 \cdot \delta TR(k)$$

$$\delta TD(k) = \delta TR(k) - \delta TB(k) - \delta TC(k)$$

In the above, $\delta$VB(k−1), $\delta$VC(k−1), $\delta$VD(k−1), $\delta$TR(k−1) and so on which are used in step 322 are of the values of the former cycle execution of this control routine as described in the above. Furthermore, the reason for obtaining δTD(k) which is one of the state estimated variables $\hat{X}(k)$, namely, the perturbation component δTD(k) of the temperature affecting the perturbation component δTR(k) of the internal air temperature by the perturbation component δVD(k) of the drive voltage of the damper actuator 24 which controls the opening degree of the air-mixing damper, as δTR(k)−δTB(k)−δTC(k), is to simplify the computation so as to improve the processing speed since the perturbation component δTR(k) of the internal air temperature is already measured (step 310). The processes of the step 322 and 324 correspond to the observer P4 of FIG. 10.

In the following step 326, it is checked according to the initial state flag FS whether the control is in the initial state. Since the initial state flag FS is reset to zero in the step 300, a step 327 is executed. The process of the step 326 corresponds to the initial state decision section P7.

In the step 327 executed only in the initial state, the deviation-accumulated values are set as follows.

$$ZTRB(k) = -\{F11 \cdot \delta TB(k) + F12 \cdot \delta TC(k) + F13 \cdot \delta TD(k)\}$$

$$ZTRC(k) = -\{F21 \cdot \delta TB(k) + F22 \cdot \delta TC(k) + F23 \cdot \delta TD(k)\}$$

$$ZTRD(k) = -\{F31 \cdot \delta TB(k) + F32 \cdot \delta TC(k) + F33 \cdot \delta TD(k)\}$$

Thereafter, the initial state flag FS is set to 1, followed by a step 328. In the case of initial state, the step 326 is followed by the step 327. On the other hand, in the case of no initial state, the step 326 is followed by the step 328.

In the step 328, the maximum value flag Bmax is set to "1" and it is checked whether the absolute value of the error e(k) calculated in the step 306 is below the reference value Tx (in this embodiment, 0.5° C.). Since the maximum value flag Bmax is set to zero in the step 300, that is, the condition of the step 328 is not satisfied, the process advances to a step 332. In the step 332, the minimum value flag Bmin is set to "1" and it is checked whether the absolute value of the error e(k) calculated in the step 306 is below the reference value Tx. Since the minimum value flag Bmin is set to "0" in the step 300, that is, the condition of the step 322 is not satisfied, the step 332 is followed by a step 336.

In the step 336, the perturbation component δVB(k) of the drive voltage of the blower motor 3, the perturbation component δVC(k) of the drive voltage of the compressor 22, and the perturbation component δVD(k) of the drive voltage of the damper actuator 24 are obtained by multiplying the state estimated variables $\hat{X}(k)=[\delta TB(k)\delta TC(k)\delta TD(k)]^T$ obtained in the steps 322 and 324 by the elements relating to the state estimated variables $\hat{X}(k)$ of the optimal feedback gain F selected in the step 312 and further adding the deviation-accumulated values obtained in the step 320 or 327. Namely, the following processes are performed.

$\delta VB(k) =$
  $F11 \cdot \delta TB(k) + F12 \cdot \delta TC(k) + F13 \cdot \delta TD(k) + ZTRB(k)$ $\delta VC(k) =$
  $F21 \cdot \delta TB(k) + F22 \cdot \delta TC(k) + F23 \cdot \delta TD(k) + ZTRC(k)$ $\delta VD(k) =$
  -continued
  $F31 \cdot \delta TB(k) + F32 \cdot \delta TC(k) + F33 \cdot \delta TD(k) + ZTRD(k)$ The process of the step 336 corresponds to the function of the feedback amount determining section P5 shown in FIG. 10. In the case of initial state, since the deviation-accumulated values are set in the step 327, the respective perturbation components δVB(k), δVC(k), δVD(k) obtained in accordance with the above-mentioned calculation are offset and become zero. On the other hand, in the case of no initial state, since the deviation-accumulated values are calculated in the step 320, the respective perturbation components δVB(k), δVC(k), δVD(k) assume predetermined values.

In a subsequent step 338, actual drive voltages VB(k), VC(k), VD(k) are obtained by adding values VBa, VCa, VDa at steady-state point to the perturbation components δVB(k), δVC(k), δVD(k) of respective drive voltages obtained in step 336. This processing corresponds to the reference value adding section P6 of FIG. 10.

In the following step 340, it is checked whether the drive voltage VB(k) of the blower motor 3 calculated in the step 338 is greater than the maximum value VBmax. If the drive voltage VB(k) exceeds the maximum value VBmax, the step 340 is followed by a step 342. In the step 342, the maximum value flag Bmax is set to "1" and the minimum value flag Bmin is reset to "0", followed by a step 350.

On the other hand, in the step 340, if the drive voltage VB(k) is less than the maximum value VBmax, the control goes to a step 344. In the step 344, it is checked whether the drive voltage VB(k) is below the minimum value VBmin. If the drive voltage VB(k) is below the minimum value VBmin, the control advances to a step 346. In the step 346, the maximum value flag Bmax is reset to "0" and the minimum value flag Bmin is set to "1", followed by the step 350.

In the step 344, if the drive voltage VB(k) exceeds the minimum value VBmin, the step 344 is followed by a step 348, in which the maximum value flag Bmax is reset to "0" and the minimum value flag Bmin is also reset to "0". The step 348 is followed by the step 350.

The processes of the steps 340, 342, 344, 346 and 348 correspond to the function of the sarturation decision section P8 of FIG. 10.

In a following step 350, respective drive voltages VB(k), VC(k), VD(k) obatained in step 338 are outputted via the output port 38 to the blower motor 3, compressor 22 and the damper actuator 24. In a step 352 the value of subscript k indicating the number of times of sampling operation control is incremented (renewed) by 1 to return to step 302 so as to repeat the processing of steps 302 through 352.

A description will be made in terms of the case that the maximum value flag Bmax is set to "1" in the step 342. When the absolute value of the error e(k) calculated in the step 306 is below the reference value Tx, that is, when, after the target temperature TR*(k) is set to the vicinity of the upper limit of controllable temperature range by the air conditioning unit 1, the error between the target temperature TR*(k) and the internal air temperature TR(k) has been below the reference value Tx as a result of supply of a great heat capacity to the passenger room 10 due to increase in air blasting amount by the blowing motor 3, the step 328 is followed by a step 330. In the step 330, the deviation-accumulated value of the blower motor drive voltage is changed as follow.

$$ZTRB(k) = \delta VBmax - \{F11 \cdot \delta TB(k) + F12 \cdot \delta TC(k) + F13 \cdot \delta TD(k)\}$$

Here, the value δVBmax is the maximum perturbation component corresponding to the maximum value VBmax of the drive voltage of the blower motor 3. Thereafter, the step 336 is executed. By the execution in the step 336, the perturbation component δVB(k) of the drive voltage of the blower motor 3 becomes the maximum perturbation component δVBmax. Furthermore, the step 338 is executed so that the drive voltage VB(k) of the blower motor 3 is set to the maximum value VBmax. Then as described above, after the maximum value VBmax is outputted in the step 350, the operational flow return through the step 352 to the step 302.

Next, a description will be made with respect to the case that the minimum value flag Bmin is set to "1" in the step 346. In this case, the control reaches through the steps 302 to 328 to the step 332. Here, when the absolute value of the error e(k) calculated in the step 306 is below the reference value Tx, that is, when, after the target temperature TR*(k) is set to the vicinity of the lower limit of controllable temperature range by the air conditioning unit 1, the error between the target temperature TR*(k) and the internal air temperature TR(k) has been below the reference value Tx as a result of supply of a heat capacity to the passenger room 10 due to decrease in air blasting amount by the blower motor 3, the step 332 is followed by a step 334. In the step 334, the deviation-accumulated value of the blower motor drive voltage is changed as follow.

$$ZTRB(k) = \delta VBmin - \{F11 \cdot \delta TB(k) + F12 \cdot \delta TC(k) + F13 \cdot \delta TD(k)\}$$

Here, the value δVBmin is the minimum perturbation component corresponding to the minimum value VBmin of the drive voltage of the blower motor 3. Thereafter, the step 336 is executed. By the execution in the step 336, the perturbation component δVB(k) of the drive voltage of the blower motor 3 becomes the minimum perturbation component δVBmin. Furthermore, the step 338 is executed so that the drive voltage VB(k) of the blower motor 3 is set to the minimum value VBmin. Then as described above, after the minimum value VBmin is outputted in the step 350, the operational flow return through the step 352 to the step 302. Thereafter, the processes for internal air temperature control between the steps 302 and 352 are repeated.

Figure 12A:
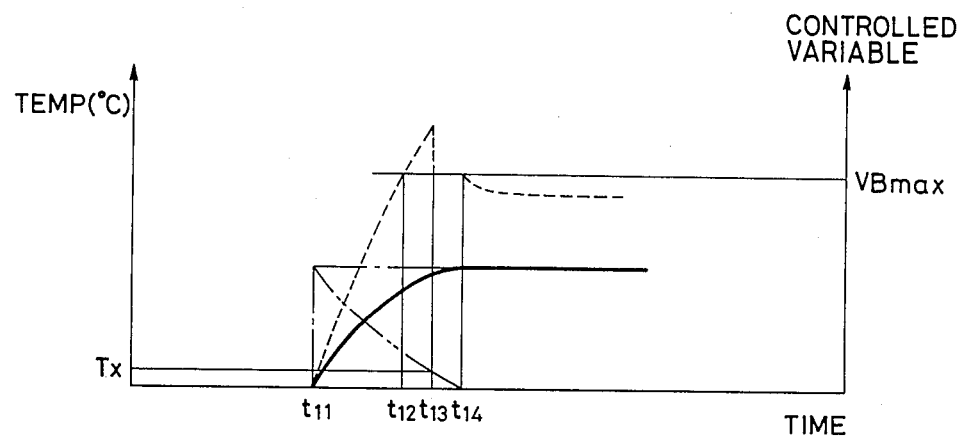
FIGS. 12A and 12B are graphic illustration useful for understanding the second embodiment.
Figure 12B:
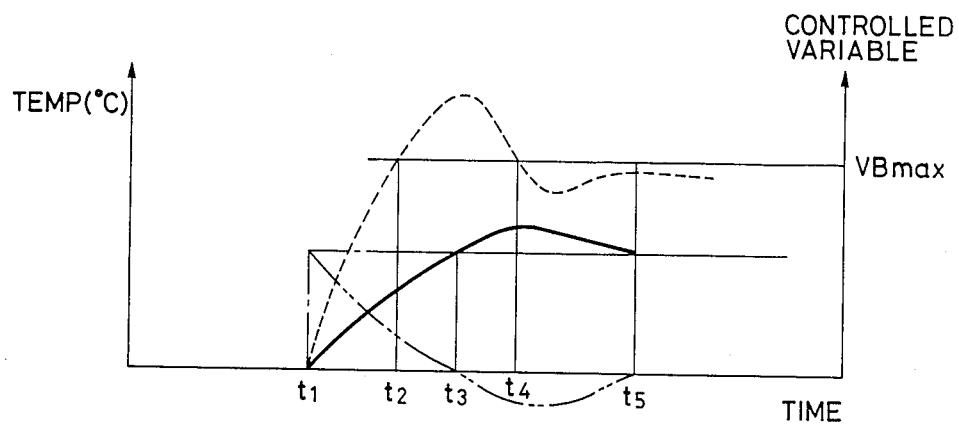

The control based on the above-mentioned processes is illustrated in FIG. 12A and the control generally performed irrespective of the blower motor driver voltage VB(k) exceeding the the maximum value VBmax is illustrated in FIG. 12B. As indicated by a dot chain line in the FIG. 12B, at the time t1, the target temperature TR*(k) is set to the vicinity of the upper limit of the air conditioning unit-controllable range. Thereby, the error e(k) indicated by a two-dot chain line becomes greater and the blower motor drive voltage VB(k) being one of controlled variables is increased as indicated by broken line and reaches the maximum value VBmax at the time t2. However, since the error e(k) is yet positive, when the general control is continuously performed, the blower motor drive voltage VB(k) is increased up to a great value that cannot be actually outputted in accordance with calculation. Therefore, at the time t3 that the internal air termperature TR(k) indicated by a solid line is coincident with the target temperature TR*(k), the calculation value of the blower motor drive voltage VB(k) becomes a great value that exceeds the maximum value VBmax. Therefore, the sign of the error e(k) is inverted, and the calculation value of the blower motor drive voltage VB(k) is started decreasing and, until dropped to the maximum value VBmax at the time t4, the internal air temperature TR(k) exceeds the target temperature TR*, resulting in occurrence of overshoot. Due to an error e(k) produced by this overshoot, the calculation value of the blower motor drive voltage VB(k) is continuously decreased and the increase in the internal air temperature TR(k) is stopped and then the internal air temperature TR(k) is started decreasing to approach the target temperature TR*. Thereafter, at the time t5 the internal air temperature TR(k) is coincident with the target temperature TR*. As described above, at the time t3 that the error e(k) once becomes zero, a greater overshoot occurs and it takes a period up to the time t5 until the internal air temperature TR(k) is finally converged to the target termperature TR*(k), resulting in deterioration in responsiveness and follow-up of the control.

On the other hand, according to the above-mentioned process, as shown in FIG. 12A, when the target temperature TR*(k) is changed at the time t11, the error e(k) is increased, and the calculation value of the blower motor drive voltage VB(k) exceeds the maximum value VBmax at the time t12. At this time, the maximum value flag Bmax is set to "1" (steps 340 and 342). Thereafter, the error e(k) is decreased so that the internal air temperature TR(k) approaches the target temperature TR*(k), and at the time t13, it goes below the reference value Tx. Therefore, the perturbation component δVB(k) of the blower motor drive voltage is set to the maximum perturbation component δVBmax and the blower motor drive voltage VB(k) is set to the maximum value Bmax (steps 328, 330, 336, and 338). Thereafter, the internal air temperature TR(k) is gradually increased until it is coincident with the target temperature TR*(k) at the time 14. Here, since the controlled variable is set to the maximum value VBmax, the controlled variable can be separated from the maximum value without greater overshoot and quickly converged to the target temperature TR*(k). After this, the blower motor drive voltage VB(k) is again calculated on the basis of the optimal feedback gain F, the state estimated variables X̂, and the deviation-accumulated value ZTRB(k).

In this embodiment, the air conditioning unit 1 corresponds to the air conditioning means M1. The temperature setting device 14, electronic circuit and the process (step 304) performed by the electronic circuit 20 correspond to the function of the temperature setting means M2. The internal air temperature sensor 12, electronic circuit 20 and the process (step 302) executed by the electronic circuit 20 correspond to the function of the temperature detecting means M3. The electronic circuit 20 correspond to the control means M4. The electronic circuit 20 and the process (steps 328, 332, 340, 342, 344, 346, 348) executed thereby correspond to the controlled variable determining means M10. The processes (steps 328, 332) executed by the electronic circuit 20 correspond to the temperature decision means M11. The electronic circuit 20 and the processes (steps 322, 324) performed thereby correspond to the state observer M6. The electronic circuit 20 and the processes (steps 306 and 320) performed thereby correspond to the first feedback amount calculating section M7. The electronic circuit 20 and the processes (steps 336, 338) executed thereby correspond to the feedback controlled-variable calculating section M8. The processes (steps 330, 334) executed thereby correspond to the first feedback amount changing section M9.

As described above, this embodiment enables improving responsiveness and follow-up as compared with the feedback control based on the classic control theory.

Even if the target temperature TR*(k) is set to the vicinity of the upper limit or lower limit of the temperature-controllable range by the air conditioning unit 1, the internal air temperature TR(k) can be converged to the target temperature TR*(k) without overshoot and undershoot.

Furthermore, the blower motor 3, compressor 22, damper actuator 24 are optimally controlled so as to prevent energy from being wasted. Furthermore, since the compressor 22 is not on-off controlled, it is possible to reduce the fluctuation of output torque of the internal combustion engine.

This is because the present embodiment is constructed such that control is performed using estimated information relating to the past history which is necessary and sufficient for predicting the state of the controlled object, that is influence on the future, through experimental analysis of the controlled object, i.e system where air conditioning is to be performed, through system identification by constructing the control apparatus by way of the electronic circuit 20 as an integral-added optimal regulator in place of simple feedback control based on predicted thermal equilibrium. Furthermore, this is because the control is performed using the maximum value VBmax or the minimum value VBmin when the target temperature TR*(k) is set to the vicinity of the upper limit or the lower limit of the temperature-controllable range by the air conditioning unit 1 and the blower motor drive voltage VB(k) being one of the controlled variables exceeds the the maximum value VBmax or the minimum value VBmin, while using the controlled variables based on the above-mentioned estimated amount in the normal condition that the target temperature TR*(k) is set to a value other than the above values.

In addition, in this enbodiment, when the deviation-accumulation values ZTRB(k), ZTRC(k), ZTRD(k) are calculated, the error e(k−1) previously sampled and calculated is used as the deviation. Therefore, it is possible to compensate for the calculating time lag of the electronic circuit 20 on a discrete-time system.

In the air conditioner for automobile according to the present embodiment, the designing of the feedback gain in the electronic circuit 20, which controls the internal air temperature, is carried out extremely logically to determine the same. Therefore, the process of setting the feedback gain through designing on the basis of experiences of a designer as in the designing of conventional control apparatus so as to perform actual adjustment if necessary is not required. Therefore, it is possible to reduce designing and development process and cost.

Although this enbodiment is arranged so that only the blower motor drive voltage VB(k) is set to the maximum value VBmax or the minimum value VBmin, it is advantageous in control accuracy to be constructed such that the above process is performed in terms of the compresser drive voltage VC(k) and damper actuator drive voltage VD(K).

Furthermore, although this embodiment is arranged such that the first feedback amount is changed when the absolute value of the error e(k) of the internal air temperature TR(k) from the target temperature TR*(k) is less than the reference value Tx, it is appropriate to be arranged so that the first feedback amount is changed when the polarity of the deviation e(k) is inverted.

THIRD EMBODIMENT

Figure 13:
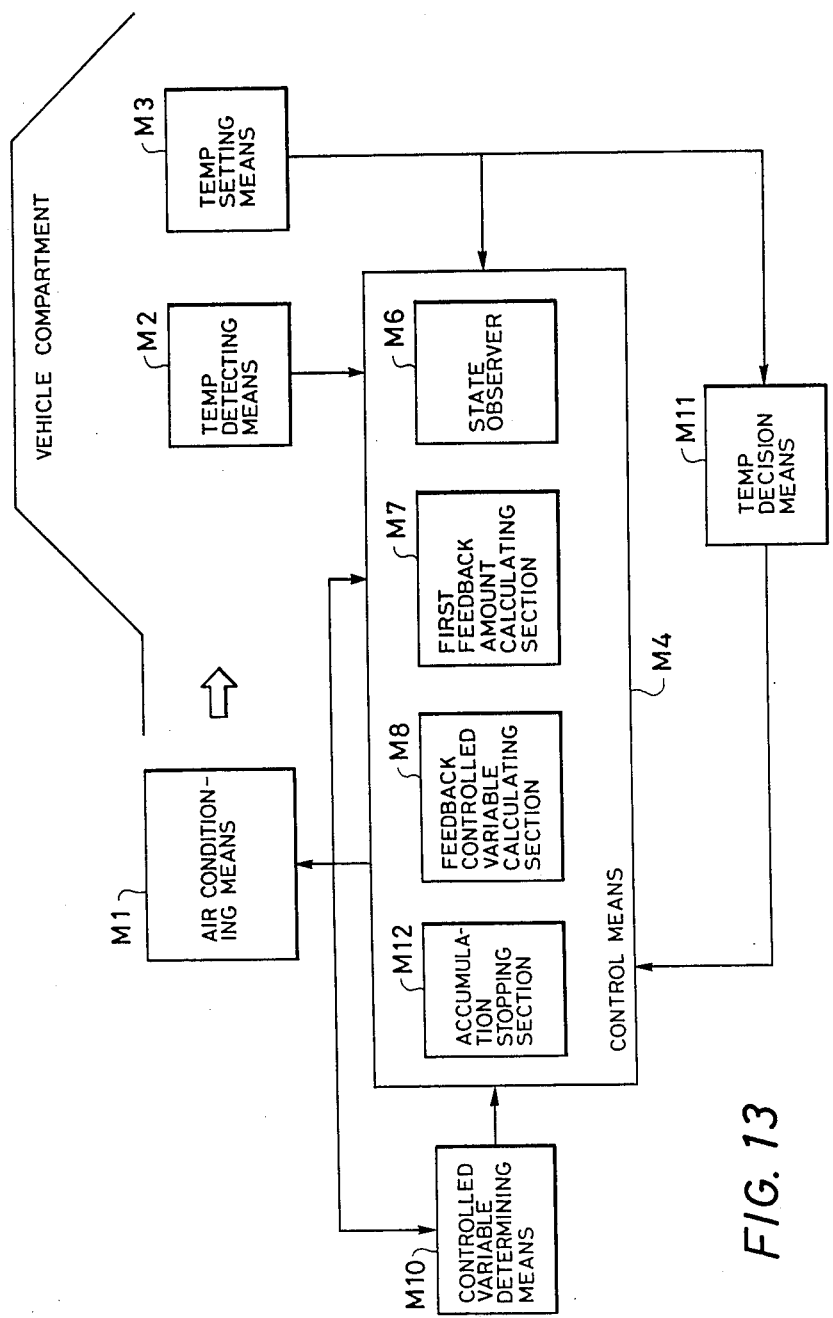
FIG. 13 is a basic structural diagram showing an air conditioner according to a third embodiment of the present invention.

Referring to FIG. 13, there is schematically illustrated a construction of the air conditioner according to a third embodiment of the present invention. The difference between the air conditioner of FIG. 13 and the second embodiment is that, although in the second embodiment the controlled variable is set to the maximum value or minimum value when the absolute value of an error becomes smaller than the reference value Tx after the controlled variable exceeds the maximum value or minimum value, the third embodiment is arranged so that the accumulation of error is not performed until the absolute value of the error becomes smaller than the reference value Tx after the controlled variable exceeds the maximum value or minimum value. Therefore, as shown in FIG. 13, the control means M4 of the air conditioner of the third embodiment is provided with an accumulation stopping section M12 in place of the first feedback amount changing section M9 of the second embodiment of FIG. 9. Although in FIG. 13 the decision means M5 is not illustrated, it is also appropriate to provide the decision means M5 in the third embodiment. A description in terms of parts corresponding to those of the second embodiment will be omitted for simplicity.

The accumulation stopping section M12 is arranged so that the accumulation of the first feedback amount in the first feedback amount calculating section M7 is interrupted until it is determined by the temperature decision means M11 that the internal air temperature corresponds to the target temperature near-by condition after it is determined by the controlled-variable determining means M10 that the controlled variable is not within a predetermined range. For example, it is appropriate to be arranged so that the first feedback amount previously obtained is used as the next first feedback amount as it is.

In the third embodiment, the integrator P2 of FIG. 10 interrupts the accumulation of the error e(k) until the error e(k) of the internal air temperature TR(k) from the target temperature TR*(k) becomes smaller than the reference value Tx after the sarturation decision section P7 determines that the controlled variable VB obtained in the feedback amount determining section P5 is not within a predetermined range, and the deviation-accumulated value ZTRB, i.e., the first feedback amount, is kept to the value prior to the interruption of accumulation. Therefore, since the accumulated value of error after the controlled variable VB reaches sarturation (the limit of a predetermined range) is not added to the controlled variable outputted from the feedback amount determining section P5, the controlled variable VB is kept to the vicinity of the sarturation point (the limit of predetermined range. Therefore, a desired value is outputted as the controlled variable when the error e(k) of the internal air temperature TR(k) from the target temperature TR* goes below the reference value Tx.

Figure 14A:
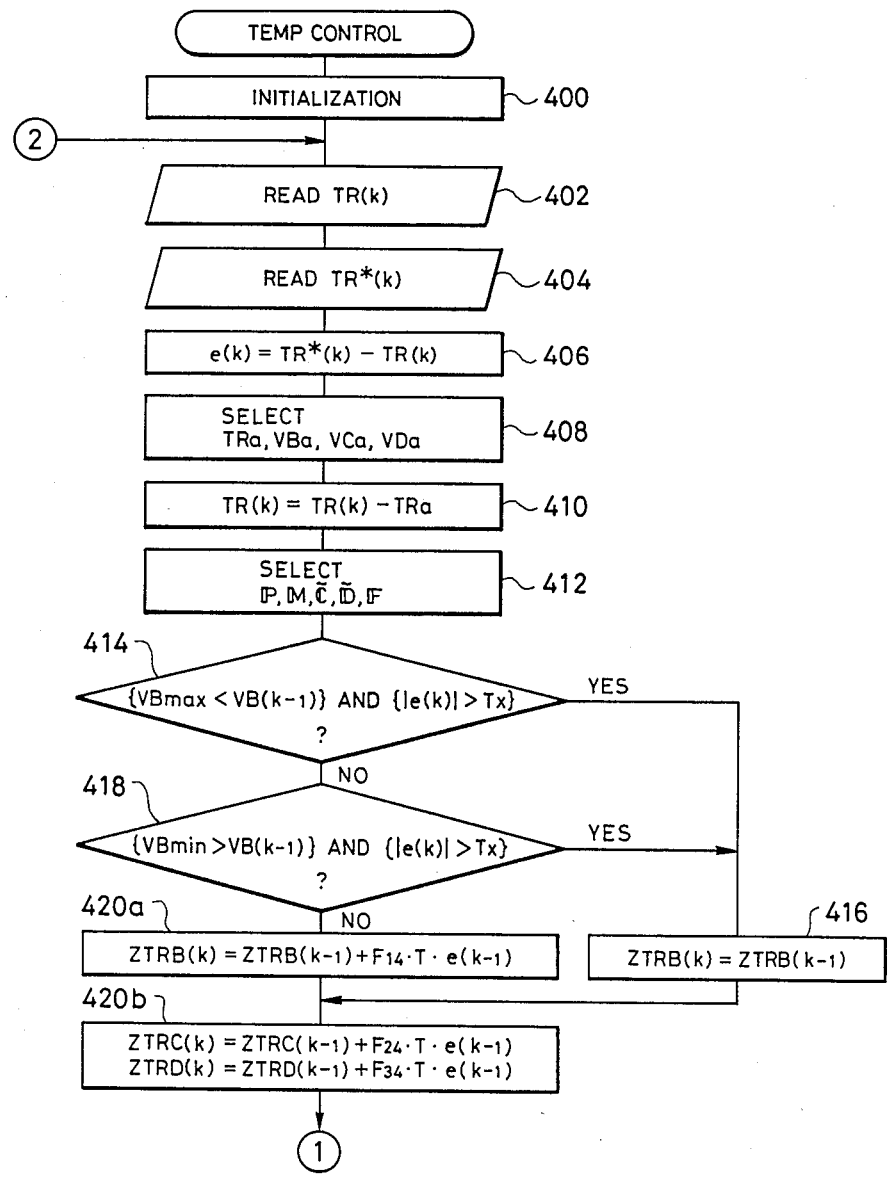
FIGS. 14A and 14B are flow charts showing the control performed in the third embodiment.
Figure 14B:
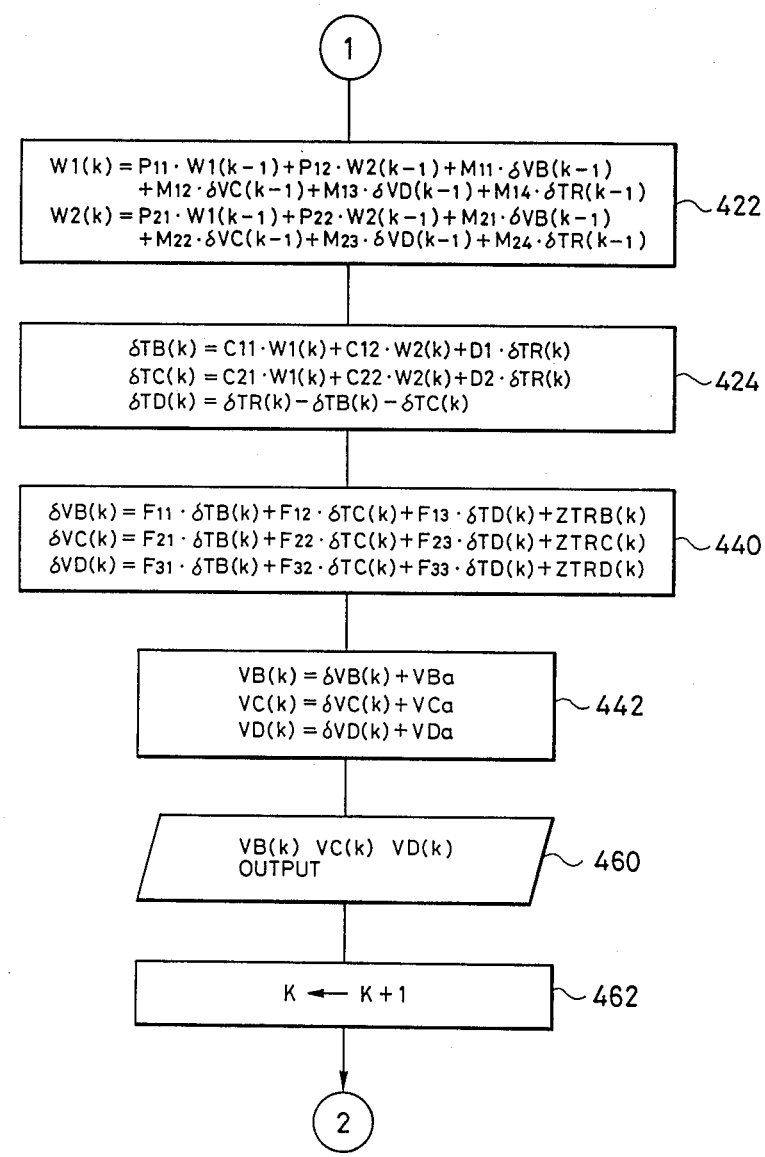

Secondly, the processes for the third embodiment performed by the electronic circuit 20 will be described with reference to FIGS. 14A and 14B.

In response to the start of internal air temperature control, the initialization is executed, the error e(k) is calculated by read the internal air temperature TR(k) and the target temperature TR*(k), the values TRa, VBa, VCa, VDa on steady-state point and perturbation component TR(k) are obtained, and the selection of the respective parameters P, M, C̄, D̄, F is performed (steps 400, 402, 404, 406, 408, 410, 412).

In a step 414, it is checked whether the blower motor drive voltage VB(k−1) previously calculated exceeds the maximum value VBmax and the absolute value of the error e(k) obtained in the step 406 exceeds the reference value Tx. If so, the control advances to a step 416 in which the deviation-accumulated value ZTRB(k) of the blower motor drive voltage is set to being equal to the value ZTRB(k−1) previously calculated. That is, the accumulation of deviation is interrupted. The step 416 is followed by a step 420b.

On the other hand, when it is determined that the blower motor drive volate VB(k−1) is smaller than the maximum value VBmax or the absolute value of the error e(k) is smaller than the reference value Tx, the step 414 is followed by a step 418. In the step 418, it is checked whether the blower motor drive voltage VB(k−1) previously obtained is smaller than the minimum value VBmin and the absolute value of the deviation e(k) calculated in the step 406 exceeds the reference value Tx. If so, control goes to the step 416 to interrupt the accumulation of the deviation, followed by the step 420b.

If in the step 418 it is determined that the blower motor drive voltage VB(k−1) is greater than the minimum value VBmin or the absolute value of the error e(k) is smaller than the reference value Tx, this step is followed by a step 420a. In the step 420a, the deviation-accumulated value ZTRB(k) of the blower motor drive voltage is obtained by accumulating the deviation as follows.

$$ZTRB(k) = ZTRB(k-1) + F14 \cdot T \cdot e(k-1)$$

In the step 420b, the deviation-accumulated values ZRTC(k), ZTRD(k) of the compressor drive voltage and damper actuator drive voltage are calculated by deviation-accumulating as follows.

$$ZTRC(k) = ZTRC(k-1) + F24 \cdot T \cdot e(k-1)$$

$$ZTRD(k) = ZTRD(k-1) + F34 \cdot T \cdot e(k-1)$$

Subsequently, state estimated variable $\hat{X}$ are calculated in steps 422 and 424. In a step 440, the perturbation components δVB(k), δVC(k), δVD(k) of the respective drive voltages are calculated on the basis of the state estimated variables $\hat{X}(k)$, the elements relating to the state estimated variables $\hat{X}(k)$ of the optimal feedback gain, and the deviation-accumulated values ZTRB(k), ZTRC(k), ZTRD(k) calculated in the steps 420b and 420a or 416. Furthermore, in a step 442, actual drive voltages VB(k), VC(k), VD(k) are calculated by adding values VBa, VCa, VDa on steady-state point to the perturbation components δVB(k), δVC(k), δVD(k) of the respective drive voltages. Subsequentlly, the respective drive voltages VB(k), VC(k), VD(k) obtained in step 460 are outputted via the output port 38 to the air conditioning unit 1, and the value of subscript k indicating the number of times of operation control is incremented (renewed) by 1 to return to step 402 (steps 462). Thereafter, the processing of steps 402 through 462 is repeated.

In this embodiment, the air conditioning unit 1 corresponds to the air conditioning means M1 of FIG. 13. The temperature setting device 14, electronic circuit 20 and the process (step 404) performed by the electronic circuit 20 corresponds to the function of the temperature setting means M2. The internal air temperature sensor 12, electronic circuit 20 and the process (step 402) executed by the electronic circuit 20 correspond to the function of the temperature detecting means M3. The electronic circuit 20 correspond to the control means M4. The electronic circuit 20 and the process (steps 412, 418) executed thereby correspond to the controlled variable determining means M10 and the temperature decision means M11. The processes (steps 422, 424) executed by the electronic circuit 20 correspond to the state observer M6. The processes (steps 406, 422a, 422b) performed thereby correspond to the first feedback amount calculating section M7. The processes (steps 440 and 442) performed thereby correspond to the feedback controlled-variable calculating section M8. The processes (step 416) executed thereby correspond to the accumulation stopping section M12.

Although this embodiment is arranged so that the accumulation of deviation is interrupted until the absolute value of the error e(k) of the internal air temperature TR(k) from the target temperature TR*(k) becomes smaller than the reference value Tx, it is also appropriate to be arranged so that the accumulation of deviation is interrupted until the sign of the error e(k) is inverted.

It should be understood that the foregoing relates to only preferred embodiments of the present invention, and that it is intended to cover all changes and modifications of the embodiments of this invention herein used for the purposes of the disclosure, which do not constitute departures from the spirit and scope of the invention. For example, the present invention may be applied to an air conditioner of reheat type, other variables are used as the state variable X(k) and so on.

What is claimed is:

1. An air conditioner for a compartment of a vehicle, comprising:
   (a) air duct means for supplying said vehicle compartment with air;
   (b) supply heat quantity controlling means for controlling an amount of heat of the air supplied from said air duct means to said vehicle compartment;
   (c) temperature setting means for setting a target temperature for air in said vehicle compartment;
   (d) compartment temperature detecting means for detecting an actual temperature of air in said vehicle compartment as a detected compartment temperature;
   (e) deviation computing means for computing a temperature deviation of said detected compartment temperature from said target temperature;
   (f) temperature perturbation component computing means for computing perturbation components of said detected compartment temperature relative to a reference temperature of said vehicle compartment under a steady air-conditioning state according to a dynamic model used for controlling the heat quantity which is predetermined through system identification;

(g) internal state estimating means for estimating an estimated internal state of said dynamic model using said perturbation components computed by said temperature perturbation component computing means;

(h) initial state decision means for determining whether said supply heat quantity controlling means is in an initial state in which said supply heat quantity means is being started;

(i) adjusting amount perturbation component computing means for computing adjusting amount perturbation components of said supply heat quantity controlling means relative to a reference adjusting amount under said steady air-conditioning state in said dynamic model on the basis of said temperature deviation computed by said deviation computing means, said estimated interval state of said internal state estimating means, and the determination made by said initial state decision means; and (j) control adjusting amount determining means for determining an adjusting control amount of said supply heat quantity controlling means on the basis of said adjusting amount perturbation components and said reference adjusting amount.

2. An air conditioner as claimed in claim 1, wherein said supply heat quantity controlling means includes means for controlling an amount of air fed from said air duct means to said vehicle compartment, a capability of cooling the air within said air duct means, and a degree of reheating cooled air.

3. An air conditioner as claimed in claim 1, wherein said temperature perturbation component computing means comprises dynamic model selecting means for selecting a dynamic model that satisfies a linear approximation in accordance with the deviation of the detected compartment temperature, said dynamic model selecting means computing a reference compartment temperature under said steady air-conditioning state in the selected dynamic model.

4. An air conditioner as claimed in claim 1, wherein said internal state estimating means is also for computing a state estimation value indicative of an internal state of said dynamic model on the basis of the adjusting amount perturbation components and the temperature perturbation components.

5. An air conditioner as claimed in claim 1, wherein said adjusting amount perturbation component computing means comprises:
integrator means for integrating said temperature deviation to provide an integrated temperature difference, and
feedback amount computing means for computing said adjusting amount perturbation components on the basis of the integrated temperature difference from said integrator means, said estimated internal state obtained by said internal state estimating means, and an optimal feedback gain for causing said compartment temperature with said dynamic model to approach said target temperature.

6. An air conditioner as claimed in claim 3, wherein said adjusting amount perturbation component computing means comprises integrated means for integrating said temperature deviation to provide an integrated temperature difference, and feedback amount computing means for computing said adjusting amount perturbation component on the basis of said integrated temperature difference from said integrator means, said estimated internal state obtained by said internal state estimating means, and an optimal feedback gain for causing said compartment temperature with said dynamic model to approach said target temperature, said feedback amount computing means comprising feedback gain determining means for determining said optimal feedback gain in accordance with said dynamic model selected by said dynamic model selecting means.

7. An air conditioner as claimed in claim 1, wherein said adjusting amount perturbation component computing means includes means for computing the adjusting amount perturbation component on the basis of deviation-accumulated values determined in accordance with the determination of said initial state decision means.

8. An air conditioner for a vehicle, comprising:
(a) air duct means for supplying a vehicle compartment with air;
(b) supply heat quantity controlling means for controlling an amount of heat of the air supplied from said air duct means to said vehicle compartment;
(c) temperature setting means for setting a target temperature for air in said vehicle compartment;
(d) compartment temperature detecting means for detecting an actual temperature of air in said vehicle compartment as a detected compartment temperature;
(e) deviation computing means for computing a temperature deviation of said detected compartment temperature from said target temperature;
(f) temperature perturbation component computing means for computing perturbation components of said detected compartment temperature relative to a reference temperature of said vehicle compartment under a steady air-conditioning state in a dynamic model used for controlling the heat quantity which is predetermined through system indentification;
(g) internal state estimating means for estimating an estimated internal state of said dynamic model using said perturbation components computed by said temperature perturbation component computing means;
(h) control condition determining means for determining whether the control condition of said supply heat quantity controlling means is within a predetermined range;
(i) adjusting amount perturbation component computing means for computing adjusting amount perturbation components of said supply heat quantity controlling means relative to a reference adjusting amount under said steady air-conditioning state in said dynamic model on the basis of said temperature deviation computed by said deviation computing means, said estimated internal state of said internal state estimating means, and the control condition determined by said control condition determining means; and
(j) control adjusting amount determining means for determining an adjusting control amount of said supply heat quantity controlling means on the basis of said adjusting amount perturbation components and said reference adjusting amount.

9. An air conditioner as claimed in claim 8, wherein said adjusting amount perturbation component computing means includes means for computing the adjusting amount perturbation component on the basis of deviation-accumulated values determined in accordance with the control condition determined by said control condition determining means.

10. An air conditioner as claimed in claim 8, further comprising initial state decision means for determining whether said supply heat quantity controlling means is in an initial state in said said supply heat quantity means is started and wherein said adjusting amount perturbation component computing means includes means for computing the adjusting amount perturbation component on the basis of deviation-accumulated values determined in accordance with the result of the determination of said initial state decision means.

11. An air conditioner as claimed in claim 8, wherein said adjusting amount perturbation component computing means includes means for computing the adjusting amount perturbation components on the basis of the limits of the predetermined range when said control condition of said supply heat quantity controlling means is not within the predetermined range and the initial temperature is in a predetermined relation to the target temperature.

12. An air conditioner as claimed in claim 11, wherein said predetermined relation is that the initial temperature approaches the target temperature up to a predetermined value.

13. An air conditioner as claimed in claim 11, wherein the predetermined relation is that the initial temperature is coincident with the target temperature.

14. An air conditioner as claimed in claim 11, wherein the predetermined relation is that the range of change in process that the initial temperature approaches the target temperature becomes between predetermined upper and lower limits.

15. An air conditioner as claimed in claim 8, wherein accumulation of the deviation is interrupted until the initial temperature assumes a predetermined value in the case that the control condition of said supply heat quantity controlling means is not within the predetermined range.

* * * * *